United States Patent [19]

Nishida et al.

[11] Patent Number: 5,272,322
[45] Date of Patent: Dec. 21, 1993

[54] IDENTIFICATION MARK READING APPARATUS

[75] Inventors: Masashi Nishida; Hiroshi Sato; Hiroyuki Hashimoto, all of Tokyo, Japan

[73] Assignee: Dai Nippon Insatsu Kabushiki Kaisha, Japan

[21] Appl. No.: 632,064

[22] Filed: Dec. 21, 1990

[30] Foreign Application Priority Data

Aug. 21, 1990 [JP] Japan .................. 2-219615
Nov. 7, 1990 [JP] Japan .................. 2-302903

[51] Int. Cl.⁵ .................................................. G06K 7/10
[52] U.S. Cl. ............................ 235/462; 235/454; 235/456
[58] Field of Search ............... 235/462, 456, 474, 454, 235/466

[56] References Cited

U.S. PATENT DOCUMENTS

| | | | |
|---|---|---|---|
| 3,949,363 | 4/1976 | Holm | 235/462 |
| 4,044,227 | 8/1977 | Holm | 250/568 |
| 4,237,375 | 12/1980 | Granholm | 235/437 |
| 4,440,248 | 4/1984 | Teraoka | 235/462 |
| 4,587,411 | 5/1986 | Obstfelder | 235/437 |
| 4,660,221 | 4/1987 | Dlugos | 235/462 |
| 4,687,912 | 8/1987 | Ohta | 235/462 |
| 4,705,939 | 11/1987 | Ulinska | 235/474 |
| 4,795,281 | 1/1989 | Ulinski | 400/103 |
| 5,059,773 | 10/1991 | Shimizu | 235/437 |

Primary Examiner—Harold Pitts
Attorney, Agent, or Firm—Ladas & Parry

[57] ABSTRACT

The reading timing determination unit determines a timing at which identification marks such as print bar codes should be read. The reading unit reads identification marks in accordance with the timing to provide identification mark data in a numerical form. The discrimination unit compares identification mark data with data value of an identification mark to be primarily printed to judge whether or not the identification mark is correctly printed. The signal generation unit produces a notifying signal when it is judged that the identification mark is not correctly printed. In this way, this apparatus tests whether or not identification marks successively printed on a moving body in the form of sheet by the printing machine are correctly printed.

16 Claims, 23 Drawing Sheets

FIG. 1(A)
FIG. 1(B)
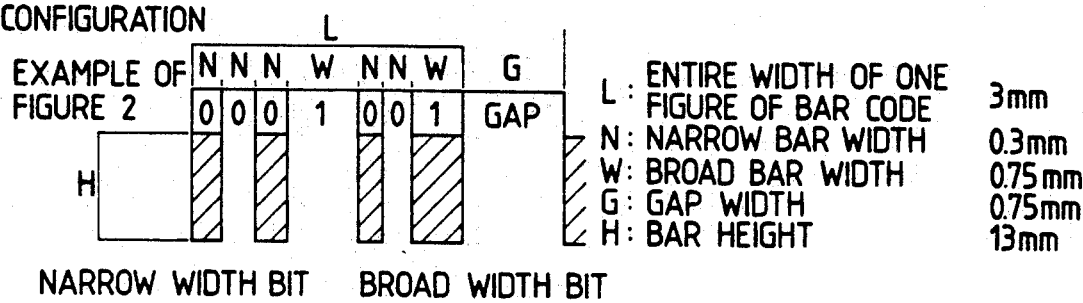
EXAMPLE OF BAR CODE CONFIGURATION
EXAMPLE OF FIGURE 2
NARROW WIDTH BIT   BROAD WIDTH BIT
L: ENTIRE WIDTH OF ONE FIGURE OF BAR CODE   3 mm
N: NARROW BAR WIDTH   0.3 mm
W: BROAD BAR WIDTH   0.75 mm
G: GAP WIDTH   0.75 mm
H: BAR HEIGHT   13 mm
FIG. 1(C)
| | BAR CODE FIGURE | 7 BIT CODE | BAR CODE PATTERN |
|---|---|---|---|
| INFORMATION CODE | 0 | 0000011 | |
| | 1 | 0000110 | |
| | 2 | 0001001 | |
| | 3 | 1100000 | |
| | 4 | 0010010 | |
| | 5 | 1000010 | |
| | 6 | 0100001 | |
| | 7 | 0100100 | |
| | 8 | 0110000 | |
| | 9 | 1001000 | |
| | - | 0001100 | |
| START, END CODE | | 0011010 | |

FIG. 2
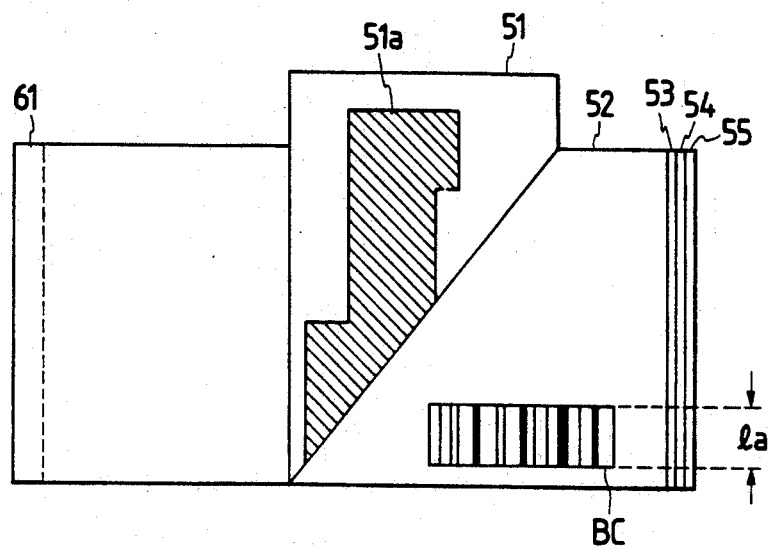
FIG. 3
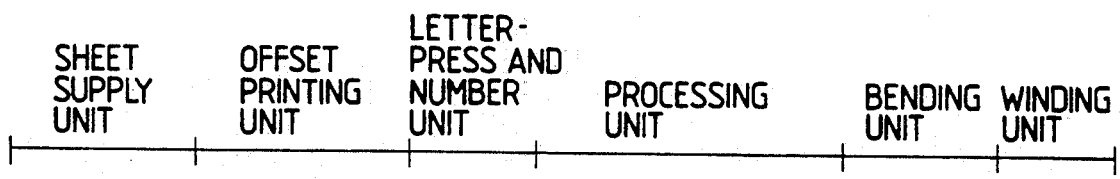
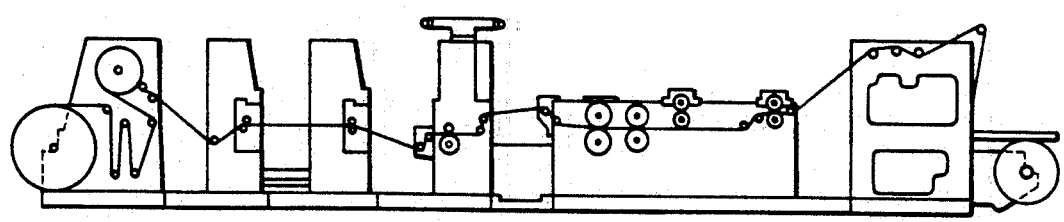

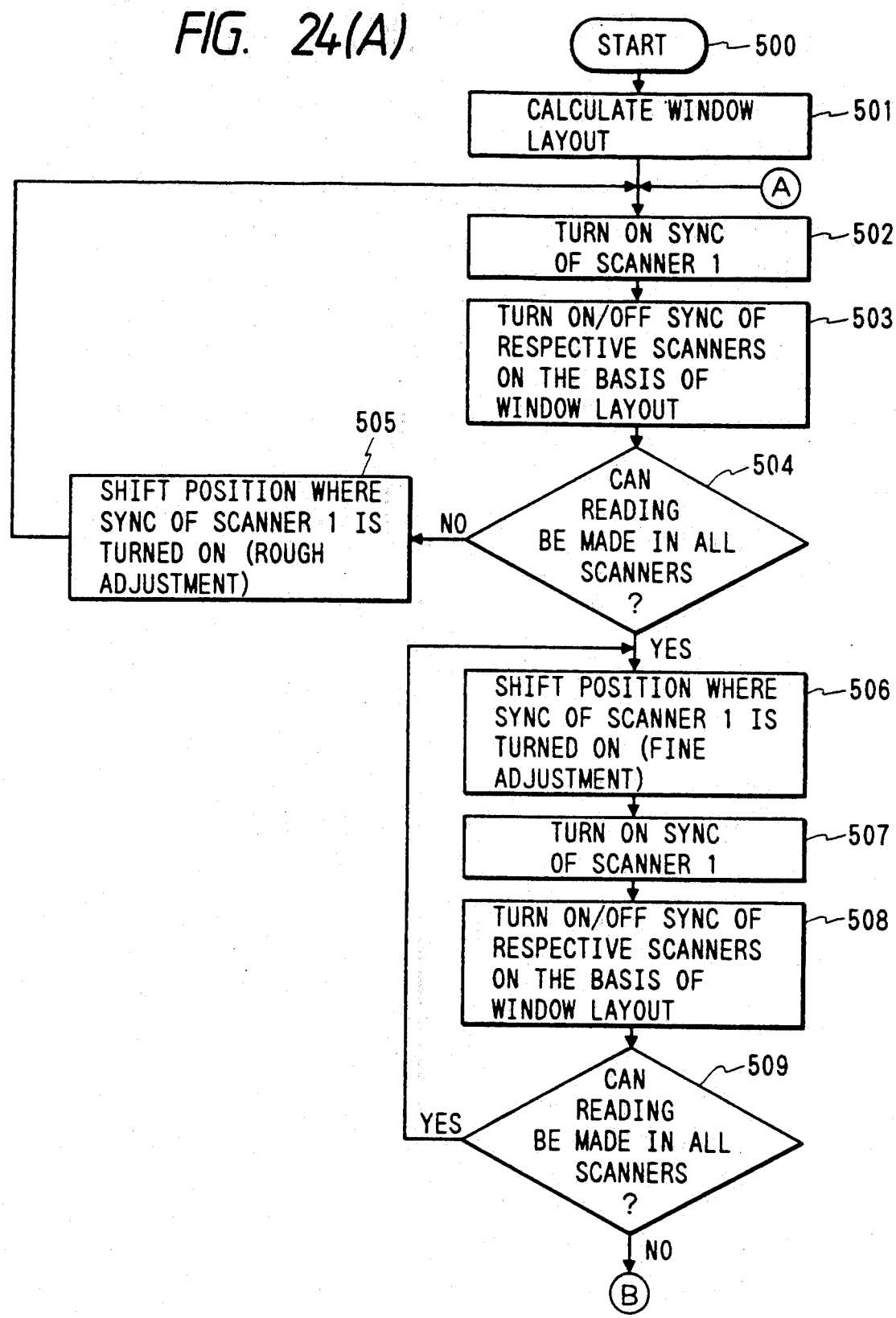

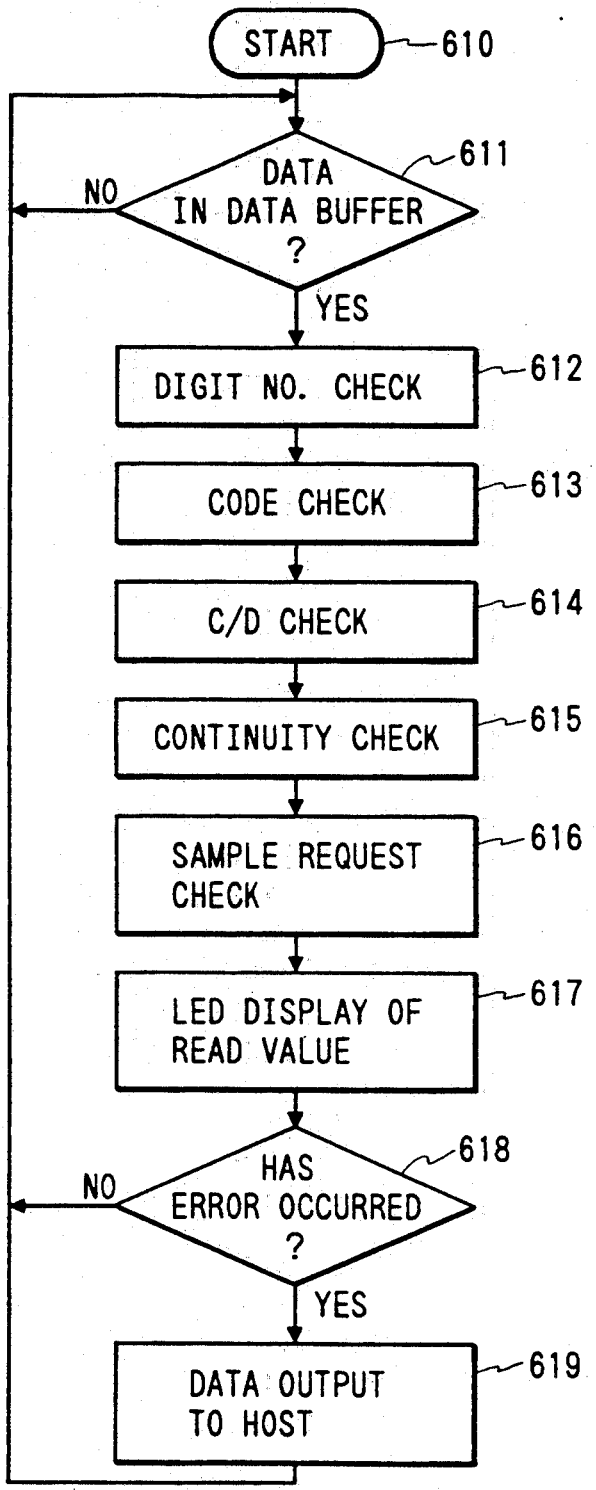

IDENTIFICATION MARK READING APPARATUS

BACKGROUND OF THE INVENTION

This invention relates to an identification mark reading apparatus for reading an identification mark attached onto a moving body, and more particularly to an identification mark reading apparatus suitable for a quality test of print bar codes successively printed on a roll sheet.

In recent years, a kind of marks called a bar code are generally attached for sorting/identifying articles, documents, or the like. Bar codes are such that alphabets or numerals, etc. are represented by combination of black bars and white bars of different widths, and combinations of a series of bars are used as respective codes for optical input.

Such bar codes are printed on a roll sheet by a printing machine. For example, in the case where an offset form rotary press machine is used as the printing machine, a bar code numbering machine is attached to the letterpress printing unit. According as respective letter rings of the bar code numbering machine are rotated in a direction to increment or decrement the numeric value one by one, bar codes are successively printed onto the roll sheet.

However, there are instances where bar codes of numbers in a wrong order may be printed by the inconvenience in operation that such letter rings do not rotate at a timing where they should rotate, or adjacent letter rings rotate at the same time. Further even if letter rings normally rotate, there may occur bad printing such as faint printing, or stained printing, etc.

As the conventional method of testing print bar codes, there is a method in which several tens to several hundreds sets of print spare portions are provided at the front end of a normal sheet of paper to estimate whether or not the print bar codes of the normal paper are abnormal in dependency upon whether or not bar codes in the print spare portions are properly printed. With this method, however, since bar codes are not tested in the middle of printing a normal sheet, even if bar codes are not properly printed by an erroneous operation of the numbering machine, or the like, such an improper printing cannot be found out until the printing is completed. As a result, there was the problem that a printed roll sheet becomes wasteful for a printing time after the time point where any extraordinary state has occurred in the bar code printing.

As the method of testing bar codes on a real time basis in the middle of printing, there is a conceivable approach to make a discrimination using the technology for implementing pattern recognition to the print bar codes themselves, or numerals on the lower side of the print bar codes to automatically monitor whether or not the print bar codes are abnormal.

SUMMARY OF THE INVENTION

To solve the above-mentioned problems, an embodiment of this invention is directed to an identification mark reading apparatus adapted to test whether or not identification marks such as print bar codes successively printed on a body or object in the form of sheet by a printing machine are properly printed, the apparatus comprising means for determining timings at which the identification mark should be read, reading means for sequentially reading the identification marks in accordance with the determined timings to form binarized identification mark data, means for displaying the identification mark data, judgement means for comparing the identification mark data with identification mark data of identification marks to be primarily printed to judge whether or not the identification marks are correctly printed, and means for producing a notifying signal when the judgement means judges that the identification marks are not correctly printed.

The above-mentioned reading timing may be also attained by an embodiment constructed below. This apparatus is directed to an identification mark reading apparatus adapted to individually read identification marks attached on a moving body or object at suitable intervals in a movement direction of the moving body or object, each comprising a plurality of identifiers having predetermined widths in the movement direction and arranged in a direction perpendicular to the movement direction, the apparatus comprising reading means for scanning the identification mark in an arrangement direction of the identifiers at a predetermined reading position to output a reading signal, and reading timing control means for effecting a control to receive an initial reading signal of a preceding identification mark in the moving direction thereafter to inhibit the reading operation of the reading means, or to inhibit the processing of a reading signal by a time corresponding to a distance shorter than a distance required until at least a succeeding identification mark succeeding to the preceding identification mark reaches the reading position to restart the reading operation or processing after movement of the inhibited distance.

The identification mark reading apparatus is constituted as above, thus making it possible to securely read the total number of identification marks per each reading operation.

Further, in the case where a plurality of identification marks are provided, an embodiment of a configuration described below may be employed for individually reading these identification marks. This apparatus is directed to an identification mark reading apparatus for individually reading a plurality of identification marks arranged at mark positions having a fixed interval in a movement direction of a moving body or object, each identification mark being comprised of a plurality of identifiers arranged in a direction perpendicular to the movement direction, the apparatus comprising a plurality of reading means for respectively scanning the plurality of identification marks in the arrangement direction of the identifiers at the predetermined reading positions to output reading signals, and reading timing control means for controlling to cause reading means of the plurality of reading means corresponding to an arbitrary mark position to scan, after the object moves a distance, from the time point when any one of a plurality of first reference positions set at a fixed interval in the movement direction of the moving object passes through a reference plane including a second reference position set at a fixed point outside the moving body and being perpendicular to the movement direction, the distance corresponds to a value expressed by the following equation;

$$r\{D_{xi}+D_p-r(D_{Ri})\}$$

where the fixed interval is designated by $D_p$, a distance from any one of first reference positions up to the arbitrary mark position is designated by $D_{xi}$, a distance from a reading position of the reading means scanning the arbitrary mark up to the reference plane is designated by $D_{Ri}$, and a remainder of division for dividing an arbitrary value A by the fixed interval $D_p$ is designated by r(A).

Since the identification mark reading apparatus of this embodiment is constituted as above, even in the case where a plurality of identification marks are printed by repetition of a fixed layout, it is possible to securely read the total number of identification marks one by one.

BRIEF DESCRIPTION OF THE DRAWINGS

FIGS. 1(A) to 1(C) are an explanatory view showing an example of a print bar code as subject to one form of this invention, FIG. 2 is a diagram showing a continuous document on which a print bar code as subject to one form of this invention is printed, FIG. 3 is a schematic view showing the configuration of an offset form rotary press machine for printing a print bar code as subject to one form of this invention.

DESCRIPTION OF THE PREFERRED EMBODIMENTS

Figure 4:
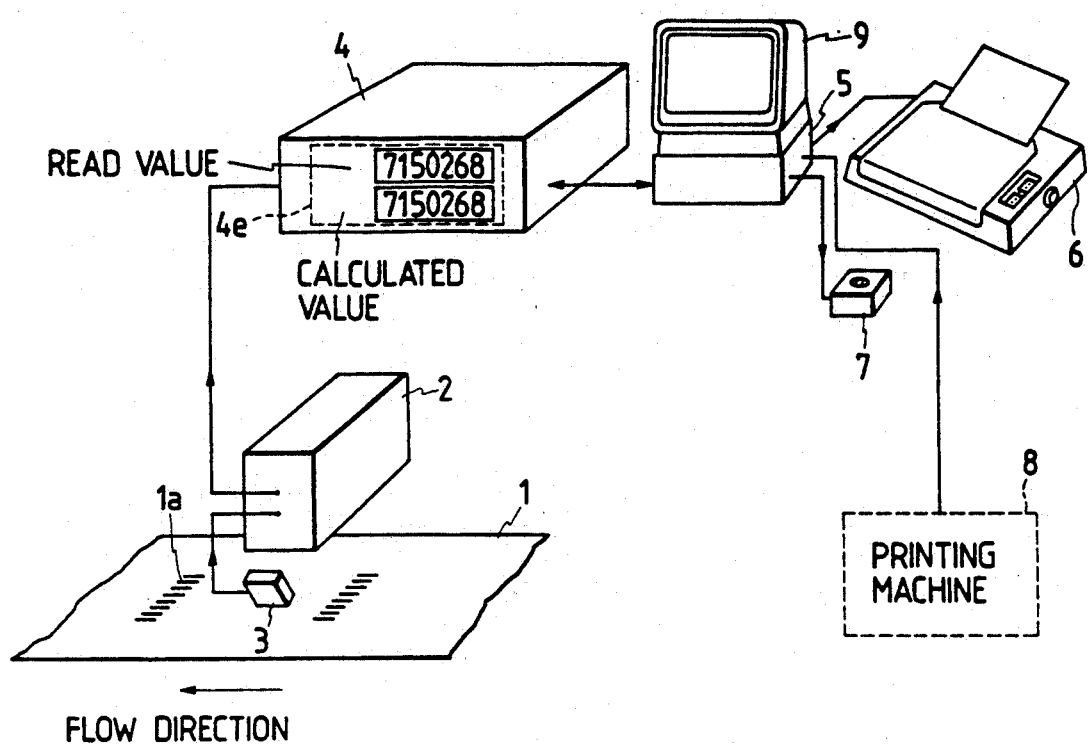
FIG. 4 is a perspective view showing the outline of a print bar code automatic testing apparatus according to a first embodiment of this invention.

Preferred embodiments of this invention will now be described with reference to the attached drawings.

Prior to the description of the invention, a bar code, a continuous document on which bar codes are printed, and a printing machine for printing bar codes will be first described.

BAR CODE

A bar code is such that alphabetical characters or numeric characters are represented by combination of black bars and white bars of different widths as shown in FIG. 1(A). Combination of a series of bars is used as a code for an optical input, etc. This bar code includes a start code and an end code indicated by alphabetic character positioned on the both sides, respectively, and bars indicating numeric characters arranged inside. Further, numeric characters or numerals that respective bars indicate are appended for visual confirmation at the lower part of the bars. Each numeral is constituted, as shown in FIG. 1(B), by four black bars of two kinds of widths and three white bars constituting gaps between four black bars, i.e., information of 7 bits. Numerals are represented using individual patterns by thicknesses of bars and combination of bars arranged in parallel. This pattern is shown in FIG. 1(C). Although there are bar codes representing numeral by different bar patterns in addition to the bar pattern shown in FIG. 1(B), the bar pattern shown in FIG. 1(C) is widely used at present.

CONTINUOUS DOCUMENT

A continuous document on which such a bar code is printed is shown in FIG. 2. This continuous document is constituted in a manner that rectangular documents 51 to 55 overlap with each other in upper and lower directions and the left end portion 61 is bound. Respective documents 51 to 55 are such that patterns, tables or the like are printed on roll papers different from each other. Bar codes are printed on the documents every respective roll sheets at a printing machine.

In the case where it is required to print bar code numbers onto documents 51 to 53 of the respective documents 51 to 55, the same number of the same bar code numbers BC are printed onto roll papers for documents 51 and 53, respectively.

In the case where an offset form transfer machine is used as a printing machine for printing a pattern, etc., according as the respective letter rings of a bar code numbering machine attached to a letterpress printing unit rotate in a direction to increment or decrement the numeric value of each letter ring one by one, bar codes are continuously printed on the roll sheets. Thereafter, the left end portion 61 is bound by pasting, etc. at a processing machine and the both ends are cut, resulting in a continuous document.

BAR CODE PRINTING MACHINE

FIG. 3 shows an offset form rotary press for carrying out a printing onto the roll sheets for making up a continuous document to which this invention is applied in one form. This offset form rotary press machine is ordinarily composed of a paper supply unit, an offset unit, a letterpress-number printing unit, a processing unit, a bending unit, and a winding unit. In addition, a carbon printing unit may be additionally provided.

In the case of printing, e.g., bar codes onto a roll sheet, a press cylinder of the letterpress-number printing unit after an offset printing is completed is replaced with a number shaft to attach a bar code numbering machine to thereby print bar codes. A plurality of bar code numbering machines are ordinarily attached onto a single number shaft. Thus, a multi-plane printing is carried out.

When numbers are printed, processing such as a marginal punching, or perforating, etc. is carried out. The roll sheet is winding-ejected, or is subjected to sheet cutting or bent at the bending unit, and is ejected.

FIRST EMBODIMENT

A printing bar code automatic testing apparatus of a first embodiment of this invention will now be described with reference to the attached drawings.

The printing bar code automatic testing apparatus of the first embodiment of this invention is constituted as shown in FIG. 4. A printing bar code reading unit 2 serves to read printing bar codes 1a continuously printed on a roll sheet 1 flowing in a direction indicated by an arrow.

Figure 5:
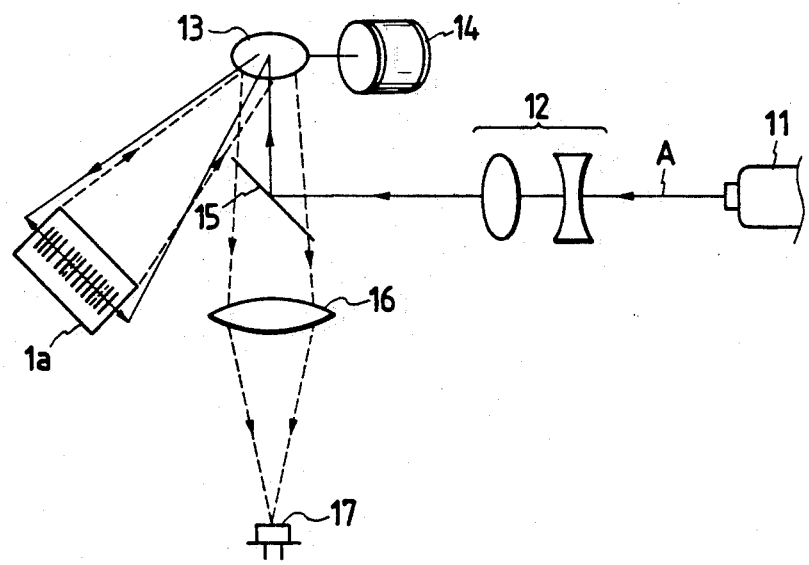
FIG. 5 is an explanatory view of a component for reading a print bar code of a print bar code reading unit in the print bar code automatic testing apparatus in FIG. 4.

The configuration of the section for reading the printing bar codes of the printing bar code reading unit 2 will now be described with reference to FIG. 5. A He-Ne gas laser output unit 11 outputs a laser beam A. After the laser beam A passes through a lens section 12, it is reflected by a half-mirror 15 and a rotary polygon mirror 13 rotated by a motor 14 to scan the print bar codes 1a. Although the rate of reading the print bar codes 1a depends upon what number of times the laser beam A scans the print bar code 1a per unit time, the number of times is determined by the rotational speed of a motor 14 and the number of planes of the rotary polygon mirror 13. In the case where the motor 14 rotates, e.g., a rotary polygon mirror having ten planes at 50 (rps), 500 times of scanning area carried out per each second. Thus, in the case of ten print bar codes 1a printed per one meter on the roll sheet 1 flowing at 2 m/s, about two times of reading can be made with respect to one print bar code. The laser beam A which has scanned the print bar codes 1a and has been reflected is reflected by the rotary polygon mirror 13 for a second time, and is focused on a light receiving element 17 after passed through a condenser lens 16. The light receiving element 17 outputs an analog current signal indicative of a pattern of the print bar codes 1a.

Figure 6:
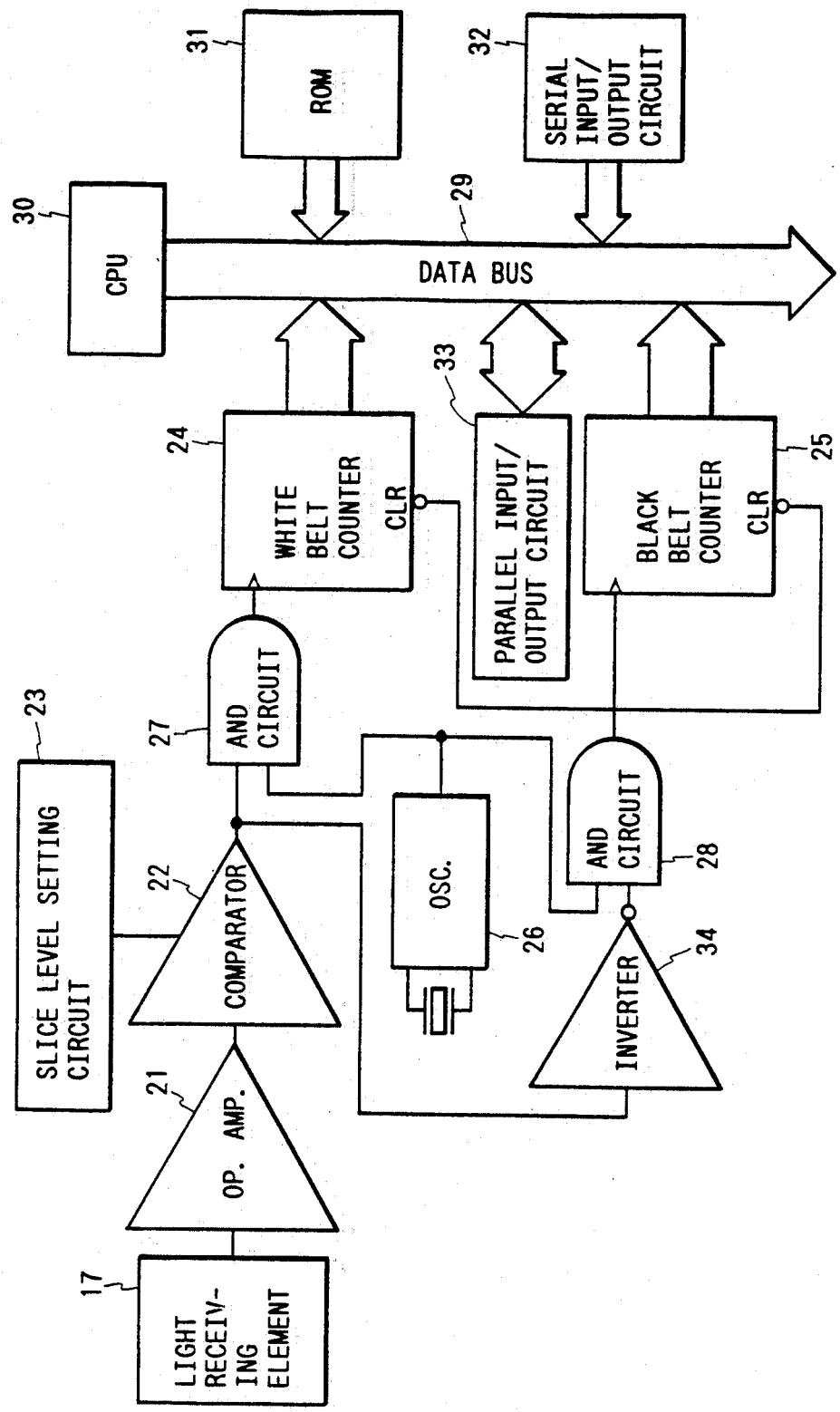
FIG. 6 is an explanatory view of a component for numerically expressing a print bar code which has been read by the print bar code reading unit in the print bar code automatic testing apparatus in FIG. 4.

Then, the print bar code which has been read by using the above-mentioned analog current signal is subjected to numeric conversion. The block diagram showing the light receiving element 17 and sections succeeding thereto is shown in FIG. 6. An analog current signal outputted from the light receiving element 17 is subjected to current-to-voltage conversion by an operational amplifier 21. The signal thus obtained is delivered to a comparator 22 as an analog voltage signal.

The comparator 22 determines a slice level by a set value that a slice level setting circuit 23 has set and changes an analog voltage signal inputted from the operational amplifier 21 to a binarized digital signal of "1" or "0" to output that digital signal. The value of "1" signifies the white belt portion on the print bar code, and the value of "0" signifies the black belt portion on the print bar code. The length of the time period during which the digital signal of "1" or "0" is outputted is varied in dependency upon the lengths of respective belts.

The circuit for measuring the lengths of times of respective digital signals are a white belt counter 24 and a black belt counter 25. An output from the comparator 22 and an oscillation pulse output from an oscillator 26 are inputted to the white belt counter 24 through an AND circuit 27. The white belt counter 24 counts the number of pulses at the portion corresponding to the white belt. An output of an inverter 34 obtained by inverting an output from the comparator 22 and an oscillation pulse output from the oscillator 26 are inputted to the black belt counter 25 through an AND circuit 28. The black belt counter 25 counts the number of pulses at the portion corresponding to the black belt. Count values from respective counters 24, 25 are taken into a CPU 30 through a data bus 29.

Figure 7:
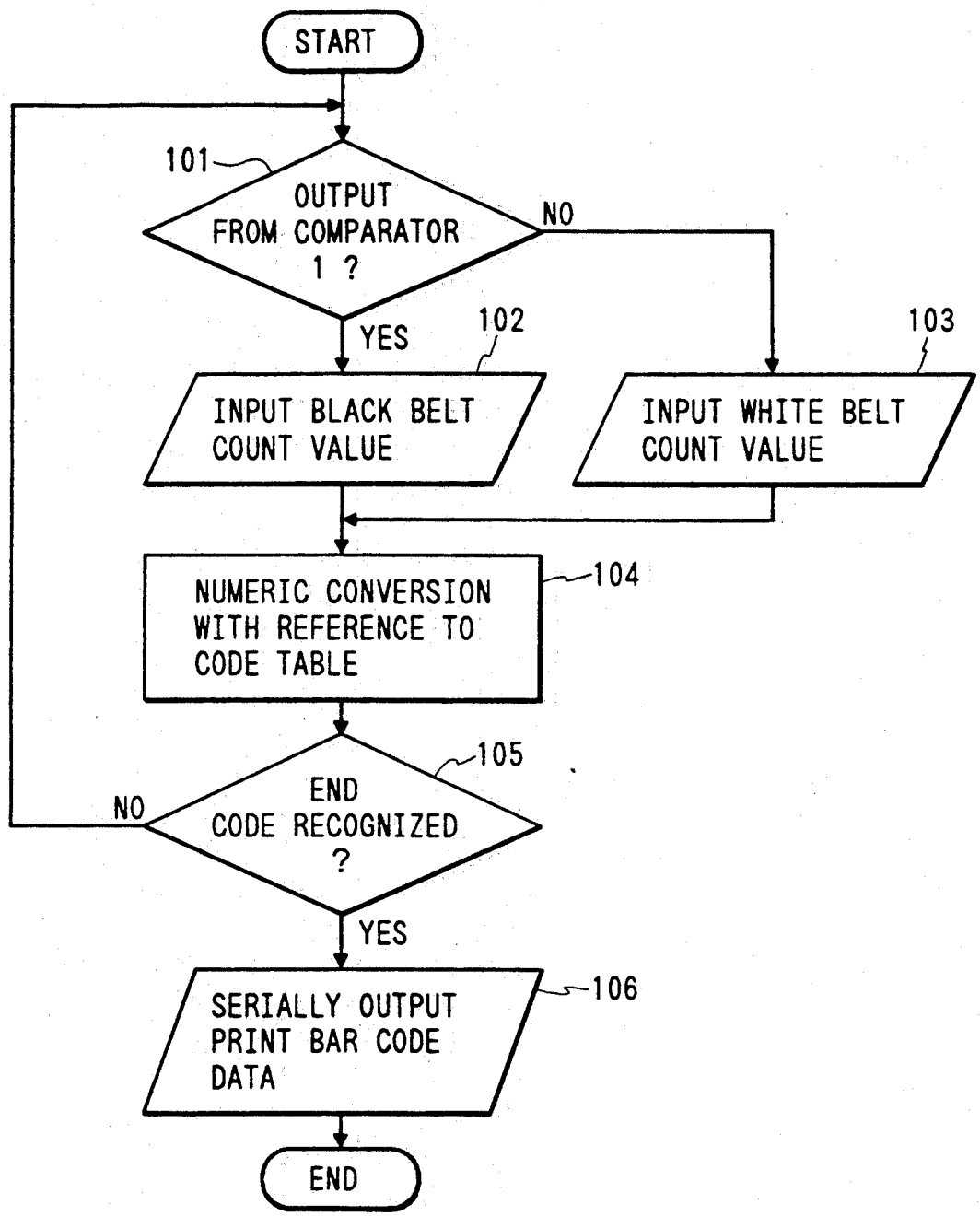
FIG. 7 is a flowchart showing the operation of CPU in FIG. 6.

The operation as to how the CPU 30 reads respective count values will now be described with reference to FIG. 7. An output from the comparator 22 is taken into the CPU 30 through a parallel input/output circuit 33 to judge whether or not the output value is "1", i.e., the CPU 30 is reading the white belt (step 101). Since the CPU 30 is reading the white belt thereinto the case of "1", the CPU 30 inputs a count value that the black belt counter 25 outputs for reading the length of the black belt positioned immediately before the white belt (step 102). At the same time, in order to clear the count value which has been read, the CPU 30 outputs a clear signal to the black belt counter 25 through the parallel input/output circuit 33. In contrast, since the black belt is being read in the case where an output from the comparator 22 is not "1", the CPU 30 inputs a count value of the white belt counter 24 signifying the length of the white belt immediately before the black belt (step 103). At the same time, in order to clear the count value which has been read, the CPU 30 outputs a clear signal to the white belt counter 24 through the parallel input/output circuit 33. The CPU 30 compares respective count values of the white and black belts with the code table of FIG. 1(C) stored in the ROM 31 to convert compared results to corresponding numeric values (step 104). When the CPU 30 recognizes the end code (step 105), the CPU 30 outputs converted results to the date bus 29. The serial input/output circuit 32 outputs the converted result as serial data to the calculation processing judgement unit 4 in FIG. 8 (step 106).

The photoelectric switch 3 determines the timing at which the print bar code reading unit 2 should read the print bar code 1a to inform it. When the print bar code 1a on the roll sheet 1 flowing in a direction indicated by an arrow arrives at the position scanned by the laser beam A, the print bar code reading unit 2 is informed of it from the photoelectric switch 3 as a timing signal. The reading unit 2 read it for a time period during which the timing signal is generated. Since the timing for reading the print bar code 1a is determined in this way, even if the interval in which the print bar code 1a is printed is varied depending upon the printing items, the print bar code can be securely read. In the event that the print bar code reading unit 2 fails to read the print bar code 1a for a time period during which the timing signal is generated, a reading disable signal is outputted to the calculation processing judgement unit 4 after the time period during which the timing signal is generated is completed.

Figure 8:
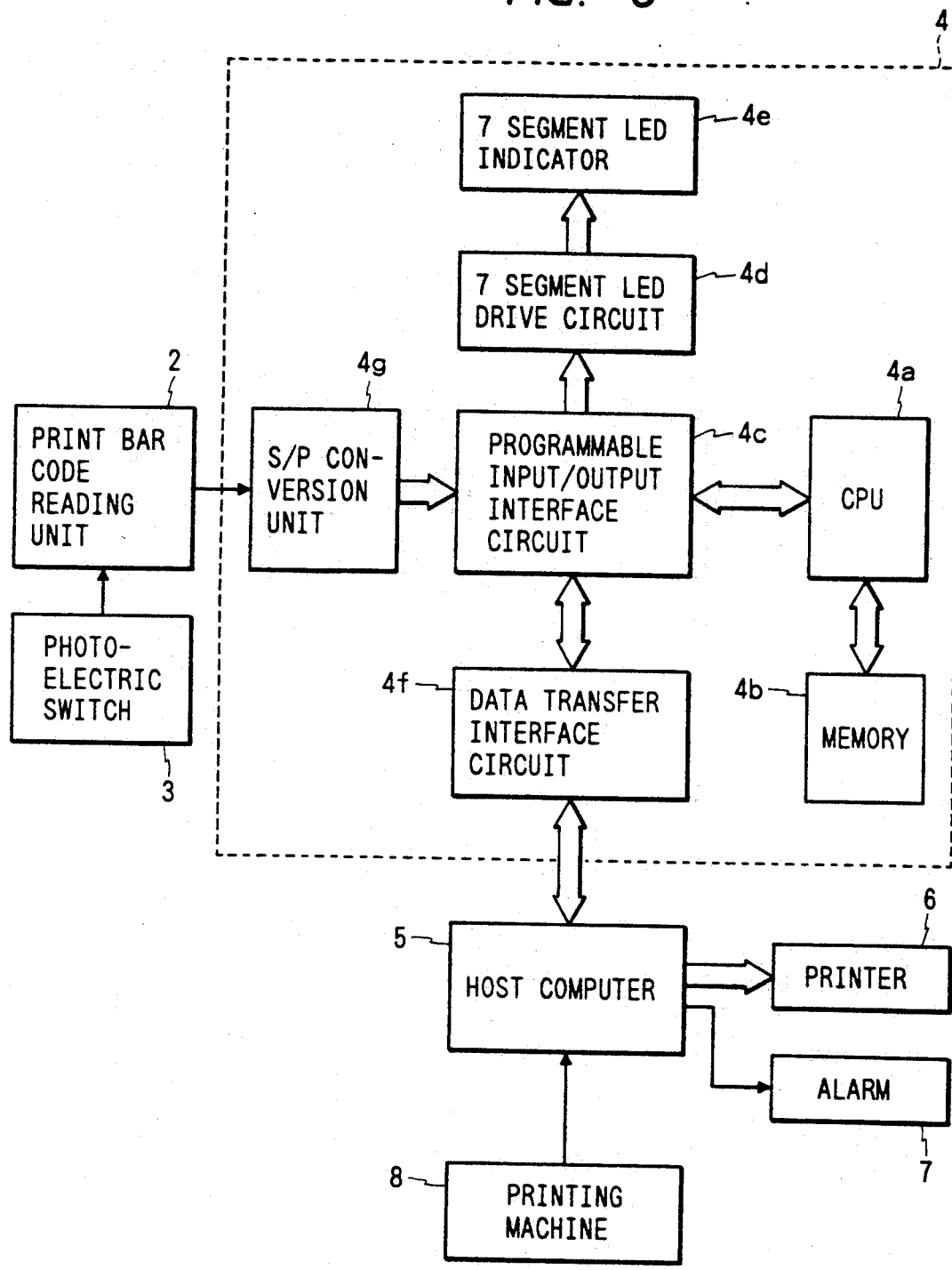
FIG. 8 is a block diagram showing a calculation processing judgement unit of the print bar code automatic testing apparatus in FIG. 4.

Respective functions and operations of calculation processing judgement unit 4, the host computer 5, the printer 6, and the alarm 7 will now be described with reference to FIG. 8. Before the printing operation of the bar code is initiated, initial data such as the number of digits of the print bar code, and/or the kind of check digit, etc. set in advance by an operator is transmitted from the host computer 5 to the data transfer interface circuit 4f of the calculation processing judgement unit 4. Such initial data is sent to the CPU 4a through the programmable input/output interface circuit 4c for carrying out control and matching of input/output of respective data, and is then stored into the memory 4b.

The host computer 5 has a function to transfer test start and test end instructions to the calculation processing judgement unit 4. When a test start instruction is outputted, the serial-to-parallel conversion unit 4g of the calculation processing judgement unit 4 converts print bar code data received from the print bar code reading unit 2 from serial data to parallel data to transmit the parallel data to the programmable input/output interface circuit 4c. The CPU 4a receives the converted print bar code data from the programmable input/output interface circuit 4c to store, into the memory 4b, data corresponding to the number of digits every one byte. The print bar code data which has been read at the first reading operation and stored into the memory 4b serves as a reference value for calculating bar code data to be primarily printed at the second reading operation and those subsequent thereto. Namely, every time print bar codes at the second reading operation and those subsequent thereto are read, 1 is added to the reference value, or is subtracted therefrom in sequence at the CPU 4a. The CPU 4a compares in sequence this value as print bar code data to be primarily printed with print bar code data already printed. Where there is a difference between the both values as the result of comparison, it is judged that a bar code different from a bar code to be printed has printed. Further, where a check digit of any kind is provided in the final digit of the print bar code 1a, that check digit is used to judge whether or not the print bar code is correct. Further, where a reading disable signal indicating that the print bar code fails to be read for the reason because the print bar code is faint, or stain, etc. is outputted from the print bar code reading unit 2, the CPU 4a judges this to be bad printing.

Where the CPU 4a judges that any extraordinary state has taken place in the print bar code 1a, the CPU 4a transmits that bar code data and the kind of extraordinary state to the host computer 5 through the data transfer interface circuit 4f. Thus, in dependency upon the kind of the extraordinary state, the host computer 5 outputs that print bar code data to the printer 6 or the CRT 9, or allows the alarm 7 to produce an alarm. At the same time, the host computer 5 also outputs an extraordinary state occurrence time to the printer 5 or the CRT 9. Further, an operating signal is transmitted from the printing machine 8 to the host computer 5 in order to discriminate whether the print bar code 1a in which that extraordinary state has occurred is printed on the print spare portion or on a normal sheet. Thus, the information indicating the portion where the extraordinary state has occurred will be outputted to the printer 6 or the CRT 9.

Further, the both data of the printing bar code data which has been read and the bar code data to be primarily printed which has been obtained by calculation are displayed over the total number of these bar code data on a 7 segment LED indicator 4e by a 7 segment LED drive circuit. Accordingly, an operator can visually make comparative judgement of both data.

As stated above, the print bar code automatic testing apparatus of this embodiment serves to test whether or not the print bar codes over the total number thereof on a real time basis in the middle in printing. For this reason, where any extraordinary state occurs in the print bar codes, prompt measure such as a measure to immediately to stop running of the printing machine can be taken, thus preventing the printing time or the roll sheet from becoming wasteful. Further, since an output to the alarm or the printer varies in dependency upon the kind of an extraordinary state such as whether or not an emergent measure is required to be taken, a suitable measure can be adopted. In addition, since this apparatus is relatively inexpensive and no visual test by an operator is required, the operator's labor can be effectively lessened.

The configuration of the first embodiment is only an example, but does not limit the identification mark reading apparatus of this invention. For example, while a print bar code which has been read at the first reading operation is used as a reference value for calculating bar code data of a print bar code to be primarily printed in the above-mentioned embodiment, data set in advance at the host computer 5 by an operator may be used.

Further, while the photoelectric switch 3 is used as means for determining a timing at which the print bar code 1a should be read, an approach may be employed to determine a timing from the rotary shaft of the printing machine 8 by using a rotary encoder, etc., or to allow the print bar code reading unit 2 itself to find out a print bar code 1a from on the roll sheet 1 to read it.

In the case of conducting a reading operation by using a laser beam at the print bar code reading unit 2, a laser output unit based on a laser system except for He-Ne gas laser may be used. Further, in the case of conducting a reading operation without using a laser beam, a laser output unit based on a system of conducting a reading by a camera or a line sensor system, etc. may be adopted. As the method of informing an operator of an extraordinary state produced in the print bar code, an alarm or an output to the printer, or an output to the CRT, etc. may be utilized.

As described above, the print bar code automatic testing apparatus of the first embodiment serves to determine a timing at which the print bar code should be read to sequentially print bar codes in accordance with the determined timing to use data thus read as print bar code data in a numerical form. This apparatus then displays the print bar code, and compares it with a numeric value of a bar code to be primarily printed to judge whether or not the print bar code is correctly printed to produce a signal when it is judged that the print bar code is not correctly printed.

Further, the means for reading print bar codes allows a laser beam outputted from the laser beam output unit to scan the print bar codes by rotating the rotary polygon mirror to condense a reflected laser beam to thereby read the total number of print bar codes.

Accordingly, since test is made over the total number of print bar codes on a real time basis in the middle of printing as to whether or not the print bar codes are correctly printed, occurrence of an extraordinary state in the print bar codes can be immediately and securely found out, making it possible to take a prompt measure such as a measure to immediately stop printing. Thus, states such that the printing time or the roll sheet may become wasteful can be avoided.

SECOND EMBODIMENT

With the print bar code automatic testing apparatus of the first embodiment, however, there were inconveniences described below: In the case where a roll sheet is changed to a roll sheet having a different reflectivity, the photoelectric switch does not respond thereto, and/or in the case where there is any print portion of high density in the vicinity of the portion where no print bar code exists, the photoelectric switch erroneously responds thereto. Accordingly, it is required to make adjustments every roll sheets so that the response speed of the photoelectric switch becomes optimum.

Further, in the testing apparatus of the first embodiment, at least two times of scanning are made with respect to one print bar code. However, only initial data obtained by the first scanning is required, but data obtained by the second scanning and those subsequent thereto are unnecessary. Conversely, if data obtained by the second scanning and those subsequent thereto are also read, the quality judgement rather becomes complicated. Accordingly, after only data at the time of first scanning is read, it is necessary to adopt a mechanism such that the photoelectric switch is turned OFF. For this purpose, it is necessary to adjust the reading timing on the basis of the photoelectric switch position, the optical reading unit position, and the printed matter carrying speed. Such an adjustment will be left to an operator of the printing line. As a result, skill was considerably required for an operator.

With the above circumstances in view, a second embodiment is directed to an apparatus constructed so as to securely permit detection of identification marks such as print bar codes attached onto a moving object.

EXAMPLE OF A PRINT BAR CODE TESTING APPARATUS UTILIZING THIS INVENTION

Prior to description of the second embodiment of this invention, an example of a print bar code testing apparatus utilizing the second embodiment of this invention will now be described.

Figure 9:
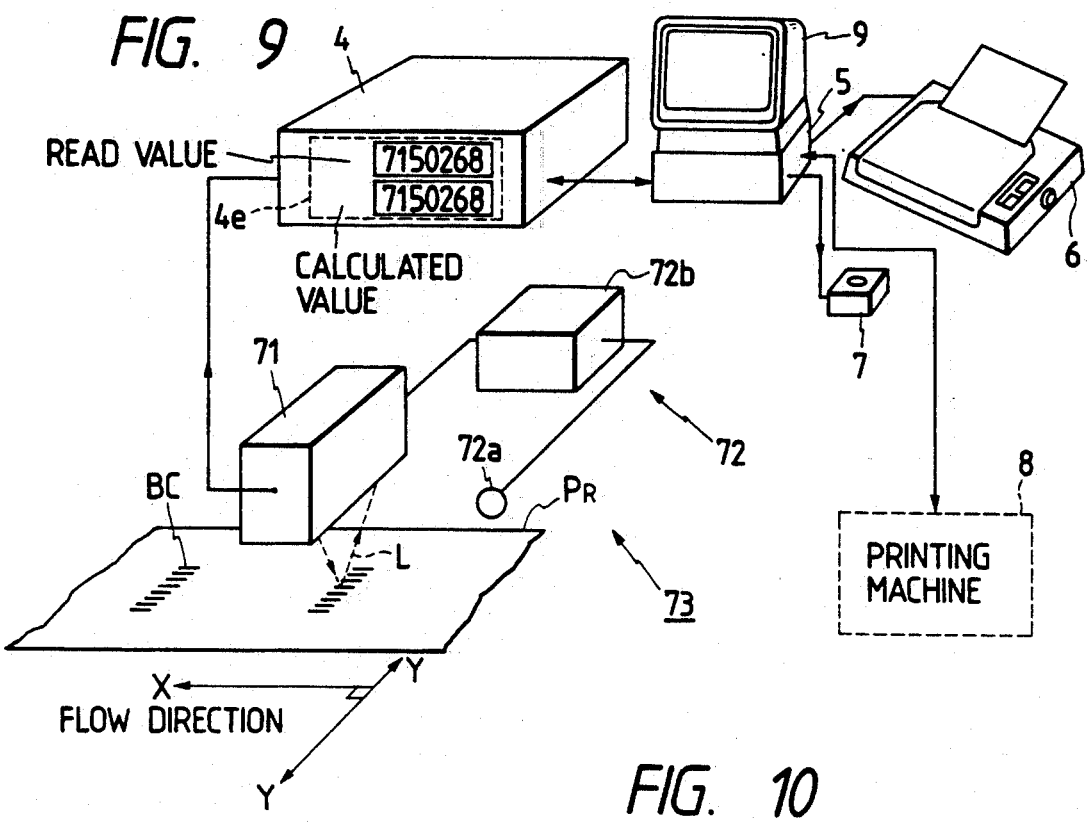
FIG. 9 is a perspective view showing the outline of a print bar code testing apparatus utilizing a second embodiment of this invention.

An example of the print bar code testing apparatus in shown in FIG. 9.

This print bar code testing apparatus includes a print bar code reading apparatus 73 which is an identification mark reading apparatus according to this invention, a calculation processing judgement unit 4, a host computer 5, a printer 6, an alarm 7, and a CRT 9. The print bar code reading apparatus 73 has a print bar code reading unit 71 serving as reading means, and a reading timing control unit 72 serving as reading timing control means. The reading timing control unit 72 includes a timing pulse generation unit 72a and a pulse control unit 72b.

The print bar code reading unit 71 reads a print bar code BC which is an identification mark printed at a suitable interval on a roll sheet $P_R$ which is an object flowing in a direction X indicated by an arrow in FIG. 9. The print bar code BC is as shown such that a plurality of black bars or white bars each serving as an identifier are arranged in a direction Y perpendicular to a movement direction X of the roll sheet $P_R$. The pulse control unit 72b outputs, to the print bar code reading unit 1, a timing at which the print bar code reading unit 71 should read the print bar code BC.

Respective functions and operations of the calculation processing judgement unit 4, the host computer 5, the printer 6, and the alarm 7 are the same as those of the first embodiment.

The second embodiment of this invention will now be described with reference to FIGS. 10 to 14.

Figure 10:
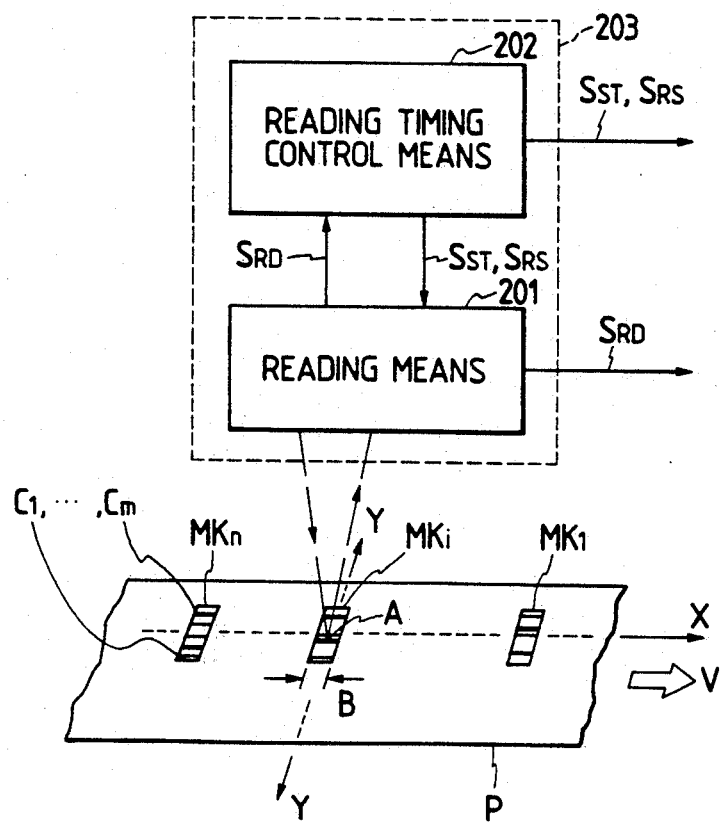
FIG. 10 is an explanatory view showing the principle of the second embodiment of this invention.

FIG. 10 is an explanatory view showing the principle of the second embodiment.

In FIG. 10, this identification mark reading apparatus 203 serves as an identification mark reading apparatus for individually reading identification marks $MK_1$ to $MK_n$ attached at a suitable interval in a movement direction X of an object on a moving object P, and each having a predetermined width B in the movement direction and comprised of a plurality of identifiers $C_1$ to $C_n$ arranged in a direction Y perpendicular to the movement direction X. This apparatus comprises reading means 201 for scanning identification marks $MK_1$ to $MK_n$ in the arrangement direction Y of the identifiers $C_1$ to $C_m$ at a predetermined reading position A to output a reading signal $S_{RD}$, and reading timing control means 202 for effecting a control to receive an initial reading signal $S_{RD}$ of a preceding identification mark $MK_{i-1}$ in the movement direction X thereafter to inhibit the reading operation of the reading means 201, or to inhibit the processing of a reading signal by a time corresponding to a distance shorter than a distance required until at least a succeeding identification mark $MK_i$ succeeding to the preceding identification mark $MK_{i-1}$ reaches the reading position A to restart the reading operation or processing after movement of the inhibited distance.

The configuration of the print bar code reading unit 71 serving as the reading means of the print bar code printing apparatus of the second embodiment will now be described with reference to FIG. 11. A semiconductor laser output unit 112 outputs a laser beam L. After passed through a lens section 113, the laser beam L is reflected by a rotary polygon mirror 115 rotating by a motor 114 to scan the print bar codes serving as the identification marks in a direction Y—Y. The speed for reading the print bar code BC depends upon how many times the laser beam L scans the print bar code BC per unit time. This number of times is determined by the rotational speed of the motor 114 and the number of planes of the rotary polygon mirror 113. In the case where, e.g., a rotary polygon mirror 113 having 10 planes is rotated by the motor 114 at 50 (rps), 500 times of scanning are made for one second. Thus, in the case of print bar codes BC printed by ten per one meter on the roll sheet $R_R$ flowing at 2 m/s, about two times of reading can be made with respect to one print bar code. The laser beam L which has scanned the print bar codes BC and has been reflected is passed through a condenser lens 116, and is then focused on the light receiving element 17. The light receiving element 17 outputs an analog current signal indicative of a pattern of the print bar codes BC.

The analog current signal outputted from the light receiving element 17 is subjected to current-to-voltage conversion by the operational amplifier 18, and is delivered to the comparator 22 as an analog voltage signal $S_1$ serving as a reading signal.

The operational amplifier 22 and components succeeding thereto shown in a block form are the same as those in the first embodiment shown in FIG. 6 except that the second embodiment includes the reading timing control unit 72. The operation of the second embodiment differs from that of the first embodiment in that when an analog voltage signal $S_1$ serving as an initial reading signal is delivered from the operational amplifier 18 to the pulse control unit 72b of the reading timing control unit 72, the pulse control unit 72b outputs a reading stop signal $S_2$ to count the number of pulses from a timing pulse generation unit 72a to output a reading restart signal $S_2$ after a predetermined inhibit time has passed.

Figure 12:
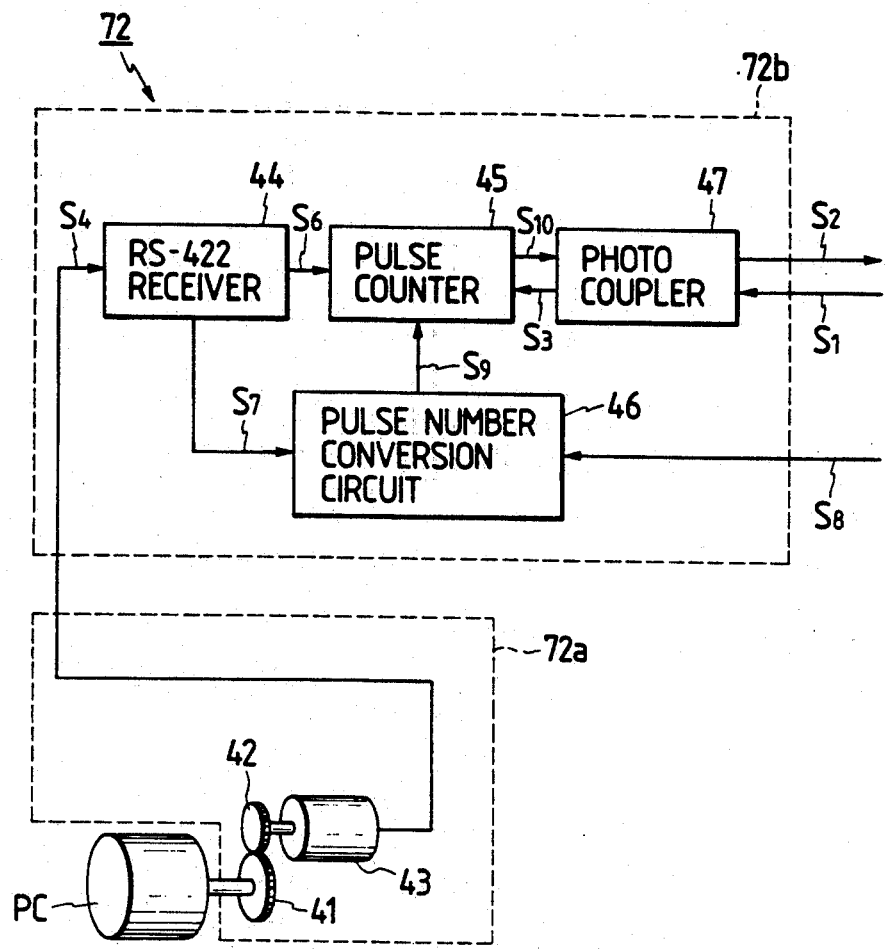
FIG. 12 is an explanatory view showing, partially in a block form, the configuration of a reading timing control unit in the second embodiment of this invention.

The operation as to how the reading timing control unit 72 serving as the reading timing control means generates a reading timing will now be described with reference to the block diagram shown in FIG. 12, the timing chart shown in FIG. 13 and the flowchart shown in FIG. 14. In FIG. 12, this reading timing control unit 72 comprises a timing pulse generation unit 72a and a pulse control unit 72b. The timing pulse generation unit 72a includes two gears 41 and 42, and a rotary encoder 43. The pulse control unit 72b includes a RS-422 receiver 44, a pulse counter 45, a pulse number conversion circuit 46, and a photo coupler 47.

The rotary encoder 43 is connected to the pulse counter 45 and the pulse number conversion circuit 46 through the RS-422 receiver 44. Further, the pulse counter 45 is connected to the print bar code reading unit 71 through the photo coupler 47.

The gear 41 is attached to the shaft of the press cylinder PC to transmit the rotation of the press cylinder PC to the rotary encoder 43 through the gear 42.

The rotary encoder serves as an encoder to measure a rotary angle displacement and generates 100 to 50,000 timing pulses per each rotation. The number of pulses mentioned above is called a resolution. In the second embodiment, a rotary encoder having a resolution of 1000 pulses per each rotation is employed.

When it is now assumed that the rotation number ratio between the press cylinder PC and the rotary encoder 43 is A:B, every time the press cylinder PC makes one rotation, $1000 \times B/A$ timing pulses are outputted. Each pulse signal is transmitted to the RS-422 receiver 44 as a signal $S_4$. The signal $S_4$ is converted to signals $S_6$ and $S_7$ at the RS-422 receiver 44. They are transmitted to the pulse counter 45 and the pulse number conversion circuit 46, respectively.

On the other hand, when a print bar code BC on the roll sheet $P_R$ serving as an object flowing in the object movement direction X (in a direction indicated by an arrow) in FIG. 9 is scanned once by the laser beam L, the print bar code reading unit 71 outputs a GO signal $S_1$ serving as an initial reading signal to the pulse counter 45. When the pulse counter 45 receives a GO signal $S_3$ through the photo coupler 47, the pulse counter 45 returns the count value to zero (count clear) to start a count operation of the timing pulse from that time point. Further, at the same time, the pulse counter 45 outputs a SYNC signals $S_2$ of "L" level (low level) serving as a reading stop signal through the photo coupler 47 (FIG. 13).

A reading stop section length serving as an inhibit distance is inputted in advance as a set data signal $S_8$ from the external to the pulse number conversion circuit 46. The reading stop section length is defined as a length to ensure that after a print bar code BC is read once, the same print bar code is not read for a second time. It is sufficient that this length is longer than the length $l_a$ in FIG. 2. From a practical point of view, the above-mentioned length is set to a length including a fixed margin in addition to the length $l_a$. The pulse number conversion circuit 46 calculates a timing pulse number N corresponding to the reading stop section length D, the circumferential length C of the press cylinder PC, and the number of timing pulses per each rotation of the press cylinder PC to set it at the pulse counter 45 as a signal indicative of a set number of pulses. Since the number of timing pulses per each rotation of the press cylinder PC is $1000 \times B/A$ and the ratio of the press cylinder is represented by D/C, the following relationship holds:

$$N = 1000 \times B/A \times D/C.$$

Figure 13:
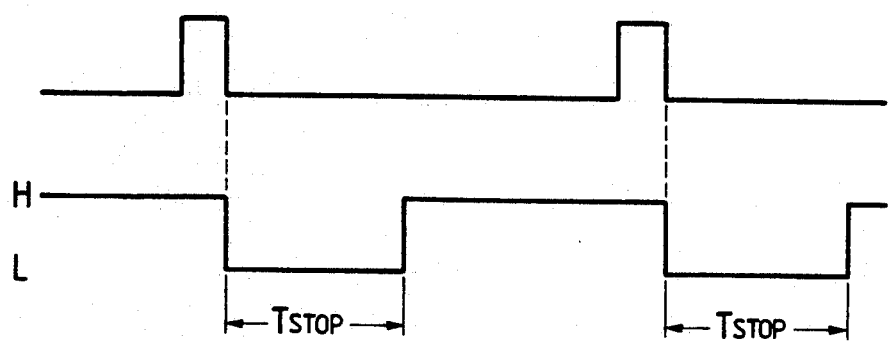
FIG. 13 is a timing chart showing the operation of the pulse counter in FIG. 12.

When the number of pulses reaches a set pulse number N, i.e., time reaches a reading restart time, the pulse counter 45 outputs a SYNC signal $S_2$ of "H" level (high level) serving as a reading restart signal (FIG. 13). Namely, a period $T_{STOP}$ during which the SYNC signal $S_2$ is at "L" level is an inhibit time corresponding to an inhibit distance where reading of print bar codes is not carried out.

Figure 14:
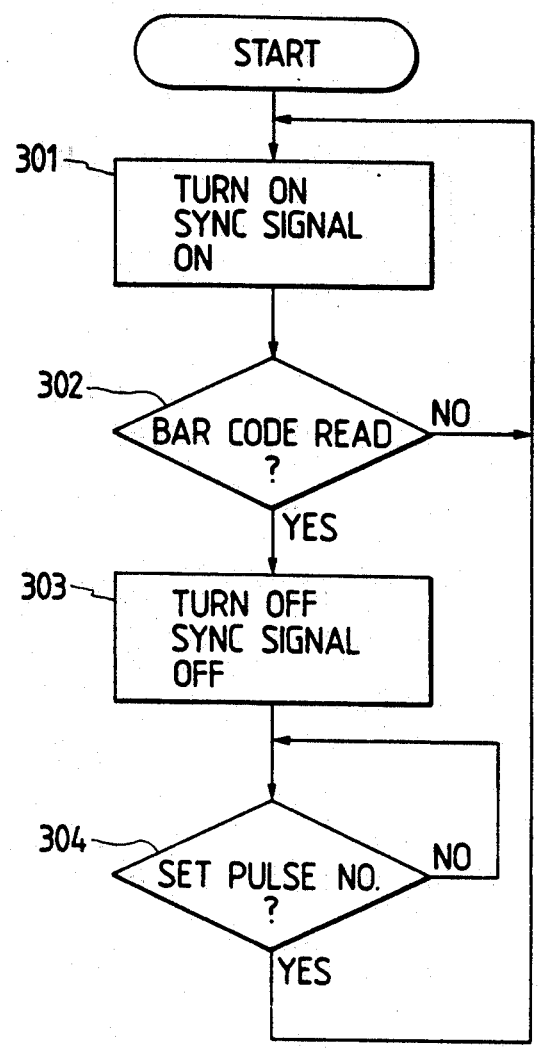
FIG. 14 is a flowchart showing the operation of the pulse counter in FIG. 13.

The flowchart of the above-mentioned operation is shown in FIG. 14. The SYNC signal is ordinarily at "H" level and is in a reading state at all times (step 301). When it is detected that the print bar code has been read once (step 302), the SYNC signal is caused to shift to "L" level, so the reading operation is stopped (step 303). Thereafter, when the number of pulses reaches a set number of pulses (step 304), the SYNC signal is caused to shift to "H" level for a second time (step 301).

In this way, the pulse control unit 72b outputs a reading stop signal and a reading restart signal $S_2$. In addition, as shown in FIG. 11, an approach may be employed to output a reading stop signal as a signal $S_{2A}$ to the CPU 30 thereafter to inhibit/restart data processing, or an approach may be employed to output a reading stop signal as a signal $S_{2B}$ to AND circuits 27 and 28 to inhibit/restart the operation of the white belt counter 24 and the black belt counter 25 and sections succeeding thereto. Further, an approach may be employed to interrupt/open the optical path of a laser beam L scanning the print bar codes BC to inhibit/restart the optical reading operation.

Since a timing at which the print bar codes BC should be read is determined in a manner stated above, even if the interval in which print bar codes BC are printed is varied in dependency upon the item of printing articles, reading operation can be securely carried out. In the event that the print bar code reading unit 71 fails to read print bar codes BC, a reading disable signal is outputted to the calculation processing judgement unit 4 after the inhibit time $T_{STOP}$ is completed. In this embodiment, the timing pulse generation unit 72a serves as a speed detection unit and a pulse generation unit. The pulse counter 45 constitutes a pulse count unit, and the pulse number conversion circuit 46 constitutes a pulse number conversion unit.

As stated above, in accordance with the print bar code reading apparatus 73 of the second embodiment, after the print bar code BC is read once, reading can be securely stopped at the portion of the reading stop section length. Accordingly, it is sufficient for an operator to only input a reading stop section length, thus making it possible to lessen the operator's labor.

The configuration of the second embodiment only an example, and therefore does not limit the print bar code reading apparatus of this invention. For example, the identification mark to be detected is not limited to the bar code, but may be codes/marks of other kinds, etc..

Further, at the print bar code reading unit 71, a laser system except for the semiconductor laser, e.g., He-Ne gas laser, etc. may be used as the laser output unit. In addition, in the case of conducting a reading operation without using a laser beam, there may be employed a reading system by camera, a line sensor system, or a system using infrared ray or magnetism, etc..

Further, the pulse generation unit may be not only a rotary encoder but also an ordinary clock generation circuit, and may include various speed sensors as the speed detection unit to adjust the number of the pulses in dependency upon a body movement speed.

As the reading stop signal and the reading restart signal, signals of other kinds may be employed. For example, there may be employed a system such that the reading stop signal shifts to "H" level at the rising of a positive pulse signal and the reading restart signal shifts to "L" level at the time of restarting reading operation.

As described above, in accordance with the second embodiment, since it is possible to scan the total number of identification marks such as print bar codes, etc. to read them one by one, this apparatus is suitable as the detection unit of an apparatus for checking whether or not the total number of identification marks printed on a print roll sheet is good. In addition, as other applications, there is conceivable an apparatus for checking development state of all the processes of flow production such as automation, or the like. In short, this apparatus can be applied to all systems utilizing a mechanism capable of securely checking identification marks on a moving body.

THIRD EMBODIMENT

Figure 15:
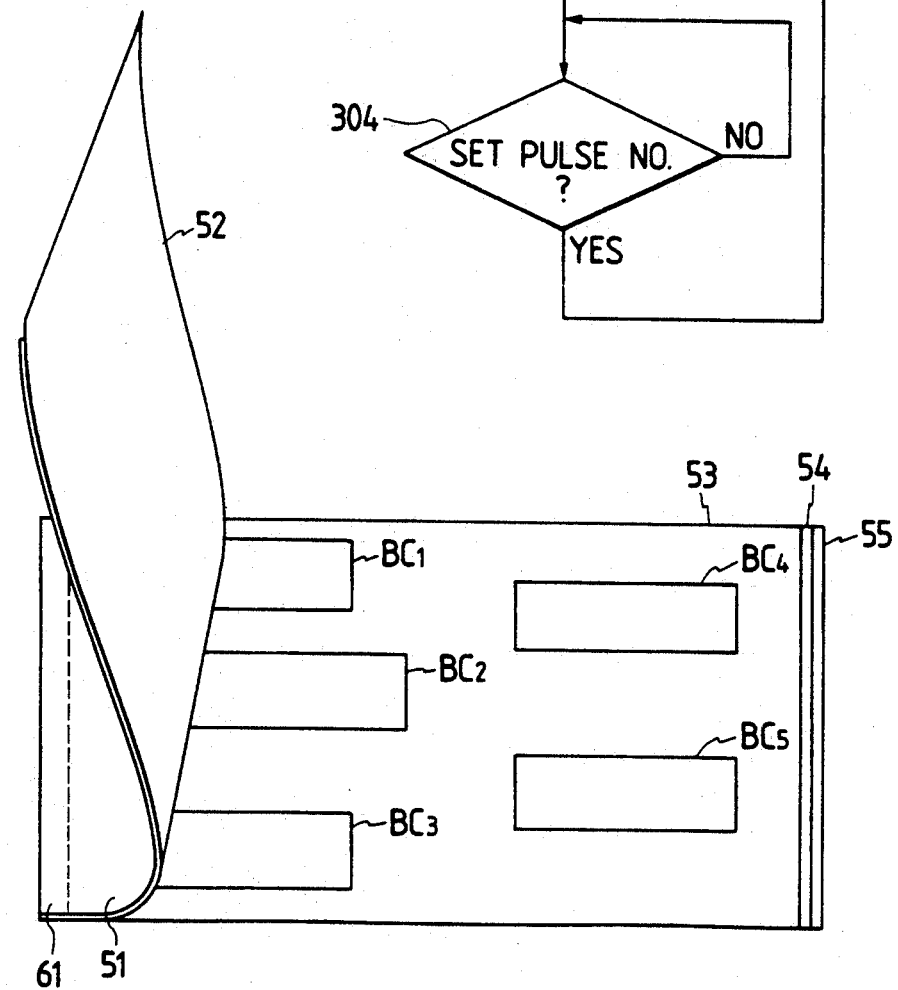
FIG. 15 is an explanatory view showing a continuous document on which a plurality of print bar codes as subject to one form of this invention are printed.

The print bar code reading apparatus of the second embodiment can only cope with the case of one print bar code with respect to one document. Accordingly, if an attempt is made to use a plurality of reading apparatuses in this form to test a document including a plurality of print bar codes as shown in FIG. 15, rigorous adjustment/setting of the set position and the scanning timing of the scanner cannot be made.

With the above-mentioned circumstances, in view, a third embodiment is constructed to securely permit detection of the plurality of identification marks such as a plurality of print bar codes, etc. attached by a fixed layout on a moving body by simple adjustment work.

PRINT BAR CODE TESTING APPARATUS

Prior to the description of a third embodiment of this invention, an example of a print bar code testing apparatus to which the third embodiment is applied will now be described with reference to FIGS. 16(A) and 16(B).

Figure 16A:
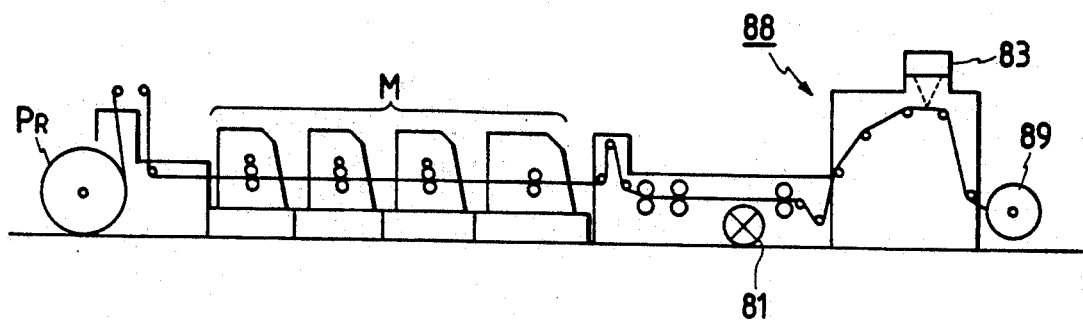
FIGS. 16(A), 16(B) and 17 are explanatory views showing the configuration of a print bar code testing apparatus utilizing a third embodiment of this invention.

The print bar code testing apparatus 88 is arranged as shown in FIG. 16(A) at the preceding stage position of a take-up roll 89 in the printing line. In the print line, a roll sheet $P_R$ is wound out, and the print bar codes BC are printed for a time period during which the roll sheet $P_R$ is passed through the printing machine M. The position and the speed of the preceding print bar code on the roll sheet $P_R$ are detected by a rotary encoder 81 arranged in the line.

Figure 16B:
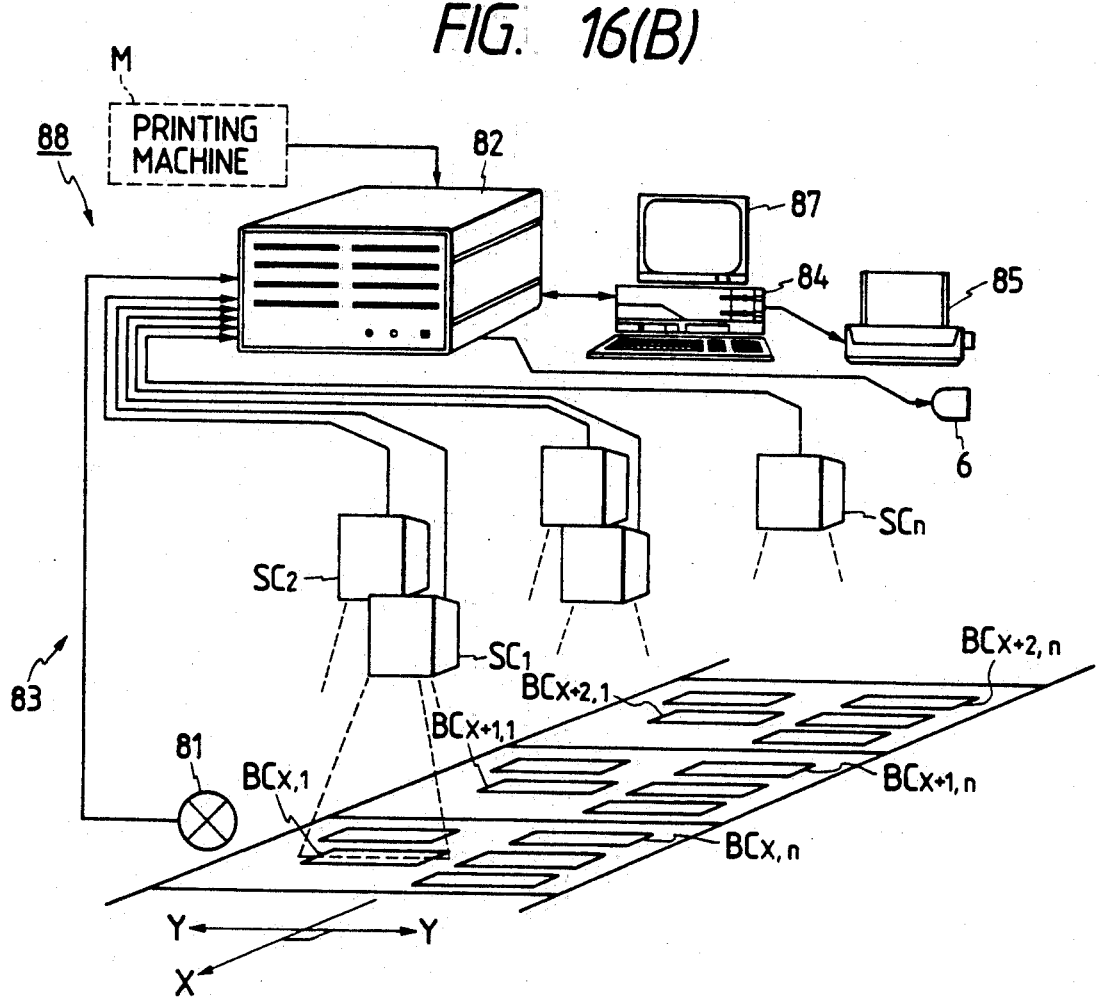

The print bar code testing apparatus 88 comprises, as shown in FIG. 16(B), a print bar code reading unit 83 which is an identification mark reading apparatus according to this invention, a host computer 84, a printer 85, an alarm 86, and a CRT 87. The print bar code reading unit 83 includes a rotary encoder 81, a plurality of scanners $SC_1$ to $SC_n$, and a computational processing judgement unit 82.

A plurality of scanners $SC_1$ to $SC_n$ read a plurality of identification marks printed by a fixed layout at a fixed interval on a roll sheet $P_R$ which is a body flowing in a direction X in FIG. 16(B). In this embodiment, the scanner $SC_i$ corresponds to print bar codes $BC_{1, i}, \ldots, BC_{x, i}, \ldots, BC_{y, i}$. As shown, print bar codes BC are such that a plurality of black bars or white bars serving as identifiers of the print bar codes BC are arranged in a direction Y perpendicular to the movement direction X of the roll sheet $P_R$. The computational processing judgement unit 82 outputs a timing at which the scanners $SC_1$ to $SC_n$ should read the print bar codes BC.

Figure 17:
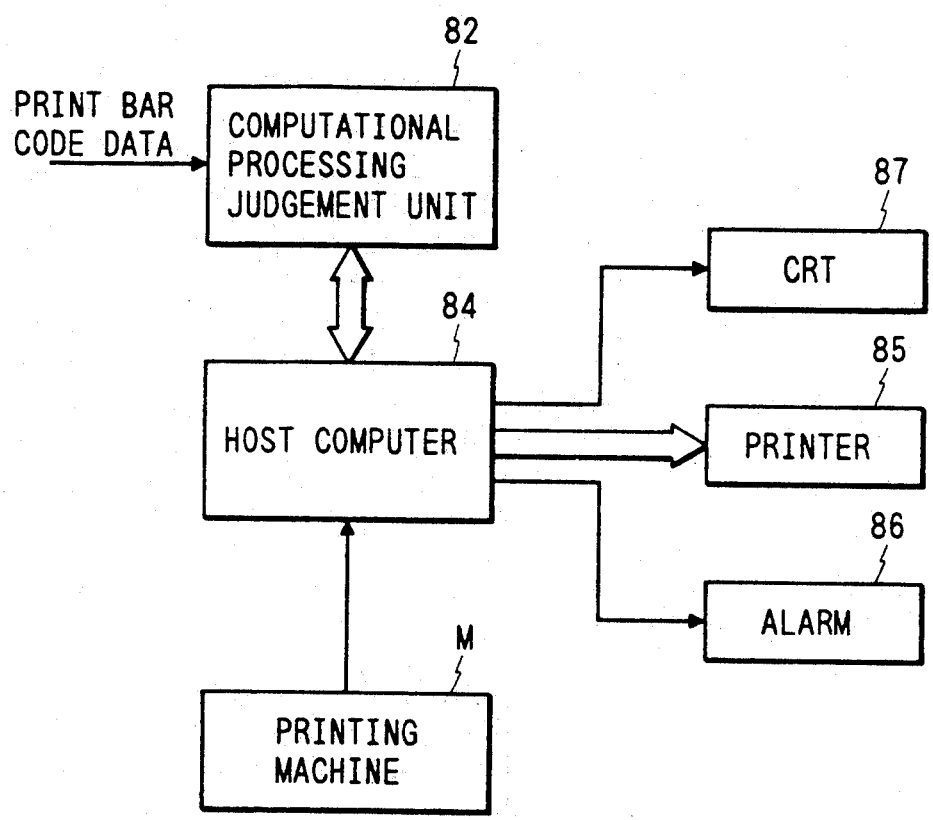

Respective functions are operations of the computational processing judgement unit 82, the host computer 84, the printer 85, the alarm 86, and the CRT 87 will now be described with reference to FIG. 17. Prior to start of printing of the bar code, initial date such as the number of digit set in advance by an operator, the kind of check digits, or the like is transmitted from the host computer 84 to an interface board (not shown) of the computational processing judgement unit 82. This initial data is transmitted to a CPU (not shown) through an interface for carrying out control and matching of input/output of respective data, and is then stored into a memory (not shown).

The host computer 84 has a function to transfer test start and test end instructions to the computational processing judgement unit 82. When a test start instruction is outputted, the computational processing judgement unit 82 converts print bar code data read by respective scanners $SC_1$ to $SC_n$ to parallel data to transmit the parallel data to the interface. The CPU receives the converted print bar code data from the interface to store, into the memory, data corresponding to the number of digits every one byte. The print bar code data which has been read at the first reading operation and stored into the memory serves as a reference value for calculating bar code data to be primarily printed at the second reading operation and those subsequent thereto. Namely, every time print bar codes at the second reading operation and those subsequent thereto are read 1 is added to the reference value, or is subtracted therefrom in sequence at the CPU. The CPU compared in sequence this value as print bar code data to be primarily printed with print bar code data already printed. Where there is a difference between the both values as the result of comparison, it is judged that a bar code different from a bar code to be printed has been printed. Further, where a check digit of any kind is provided in the final digit of the print bar code, that check digit is used to judge whether or not the print bar code is correct. Further, where the print bar code fails to be read for the reason because the print bar code is faint, or stain, etc., the CPU judges this to be bad printing.

Where the CPU judges that any extraordinary state has taken place in the print bar code BC, the CPU transmits that bar code data and the kind of extraordinary state to the host computer 84 through the interface. Thus, in dependency upon the kind of the extraordinary state, the host computer 84 outputs that print bar code data to the printer 85 or the CRT 87, or allows the alarm 86 to produce an alarm. At the same time, the host computer also outputs an extraordinary state occurrence time to the printer 85 or the CRT 87. Further, an operating signal is transmitted from the printing machine M to the host computer 85 in order to discriminate whether the print bar code in which that extraordinary state has occurred is printed on the print spare portion or on a normal sheet. Thus, the information indicating the portion where the extraordinary state has occurred will be outputted to the printer 85 or the CRT 87.

Further, the both data of the print bar code data which has been read and the bar code data to be primarily printed which has been obtained by calculation are displayed over the total number of these bar code data on an LED indicator (not shown). Accordingly, an operator can visually make comparative judgement of both data.

The third embodiment of a print bar code reading apparatus according to this invention will now be described with reference to FIGS. 18 to 27.

Figure 18:
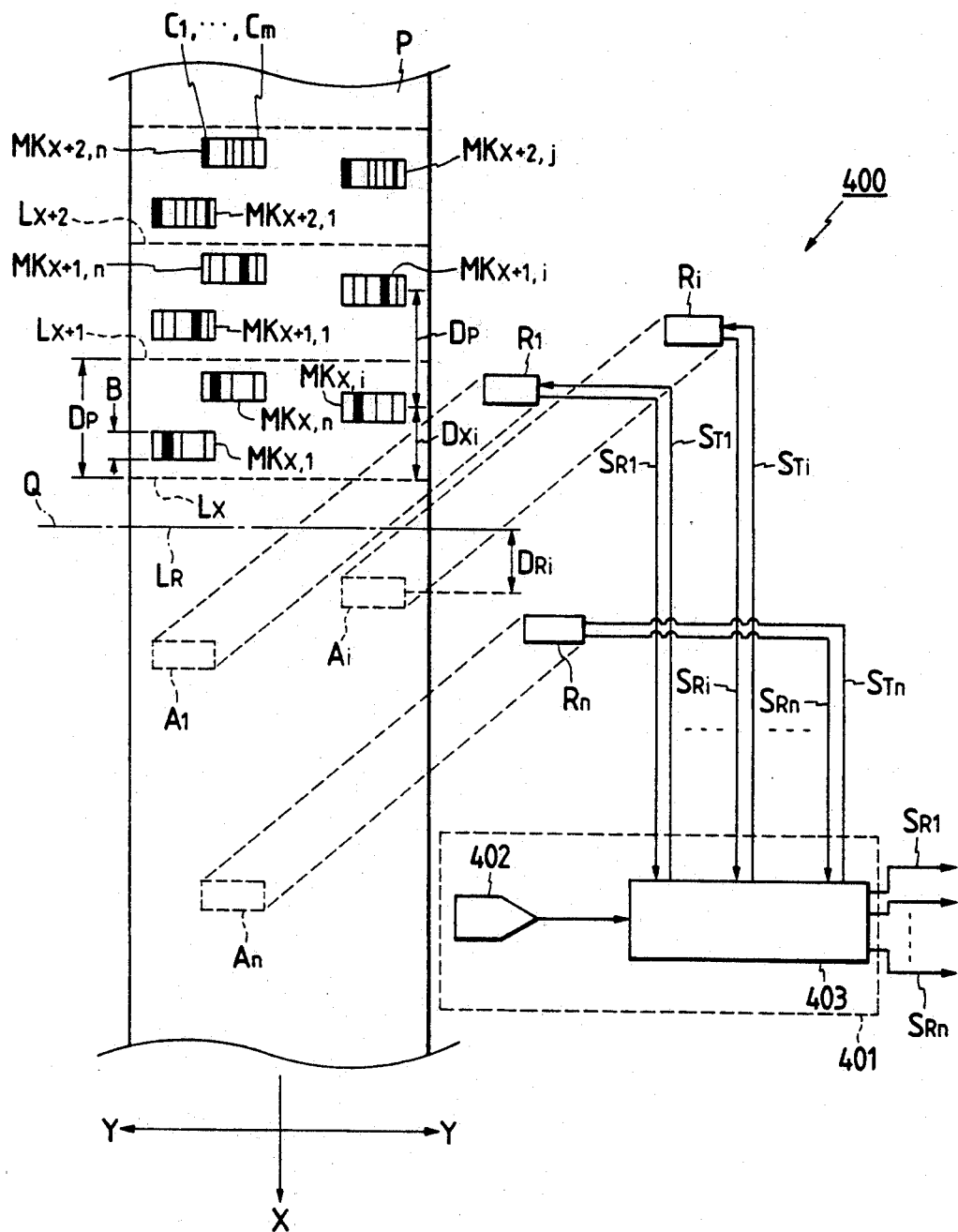
FIG. 18 is an explanatory view showing the principle of the third embodiment of this invention.

FIG. 18 is an explanatory view showing the principle of the third embodiment.

In FIG. 18, this identification mark reading apparatus 400 is constructed to individually read a plurality of identification marks MK arranged at mark positions having a fixed interval $D_P$ in a movement direction X of a moving body P, each comprises of a plurality of identifiers $C_1, \ldots, C_m$ having a predetermined length B in the movement direction X and arranged in a direction Y perpendicular to the movement direction. This identification mark reading apparatus 400 includes a plurality of reading means $R_1$ to $R_n$, and reading timing control means 401. The plurality of reading means $R_1$ to $R_n$ respectively scan the plurality of identification marks MK in the arrangement direction Y of their identifiers at predetermined reading positions $A_1$ to $A_n$ to output reading signals. The reading timing control means 401 effects a control as follows. Namely, reading timing control means 401 controls to cause reading means $R_i$ of the plurality of reading means $R_1$ to $R_n$ corresponding to an arbitrary mark position $MK_{x, i}$ to scan, after the object P moves a distance, from the point when any one of a plurality of first reference positions $L_1, \ldots, L_x, \ldots, L_y$ set at a fixed interval $D_p$ in the movement direction X of the moving object P passes through a reference plane $L_R$ including a second reference position Q set at a fixed point outside the moving body P and being perpendicular to the movement direction X, the distance corresponds to a value expressed by the following equation:

$$r\{D_{xi} + D_p - r(D_{Ri})\}$$

where the fixed interval is designated by $D_p$, a distance from any one of first reference positions up to the arbitrary mark position is designated by $D_{xi}$, a distance from a reading position of the reading means scanning the arbitrary mark up to the reference plane $L_R$ is designated by $D_{Ri}$, and a remainder of division for dividing an arbitrary value A by the fixed interval $D_p$ is designated by $r(A)$.

Figure 19:
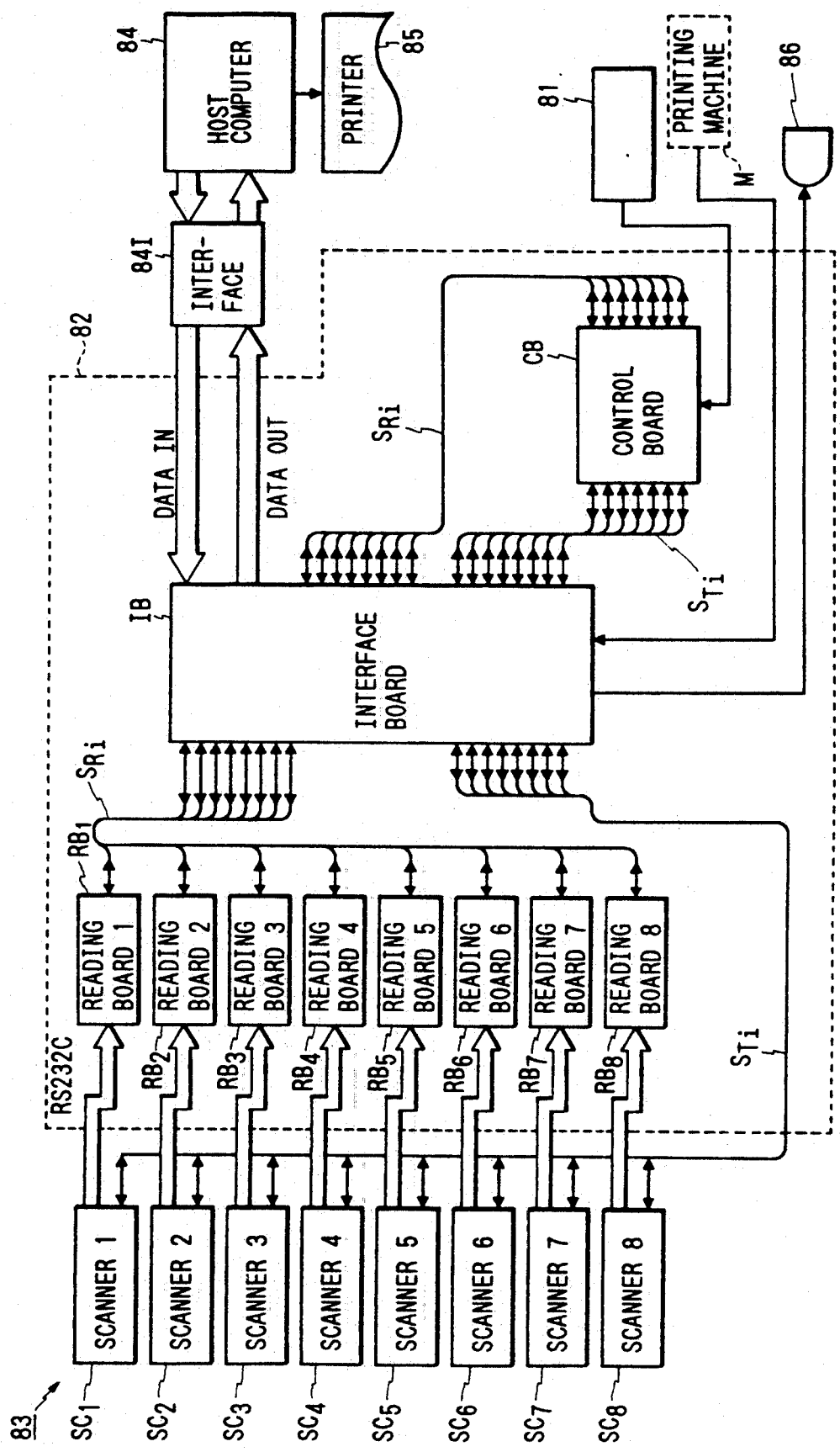
FIG. 19 is a block diagram showing the configuration of a print bar code reading apparatus according to the third embodiment of this invention.

The configuration of the print bar code reading apparatus 83 of the third embodiment is shown in a block form in FIG. 19. The print bar code reading apparatus 83 includes scanners $SC_1$ to $SC_8$, a rotary encoder 81, and a computational processing judgement unit 82. The computational processing judgement unit 82 includes reading boards $RB_1$ to $RB_8$, a control board CB, and an interface board IB. In this embodiment, the scanners $SC_1$ to $SC_8$ and the reading boards $RB_1$ to $RB_8$ constitute reading means, and the control board CB constitutes reading timing control means and the reading timing control unit. Further, the rotary encoder 81 constitutes a position detection unit.

Figure 20:
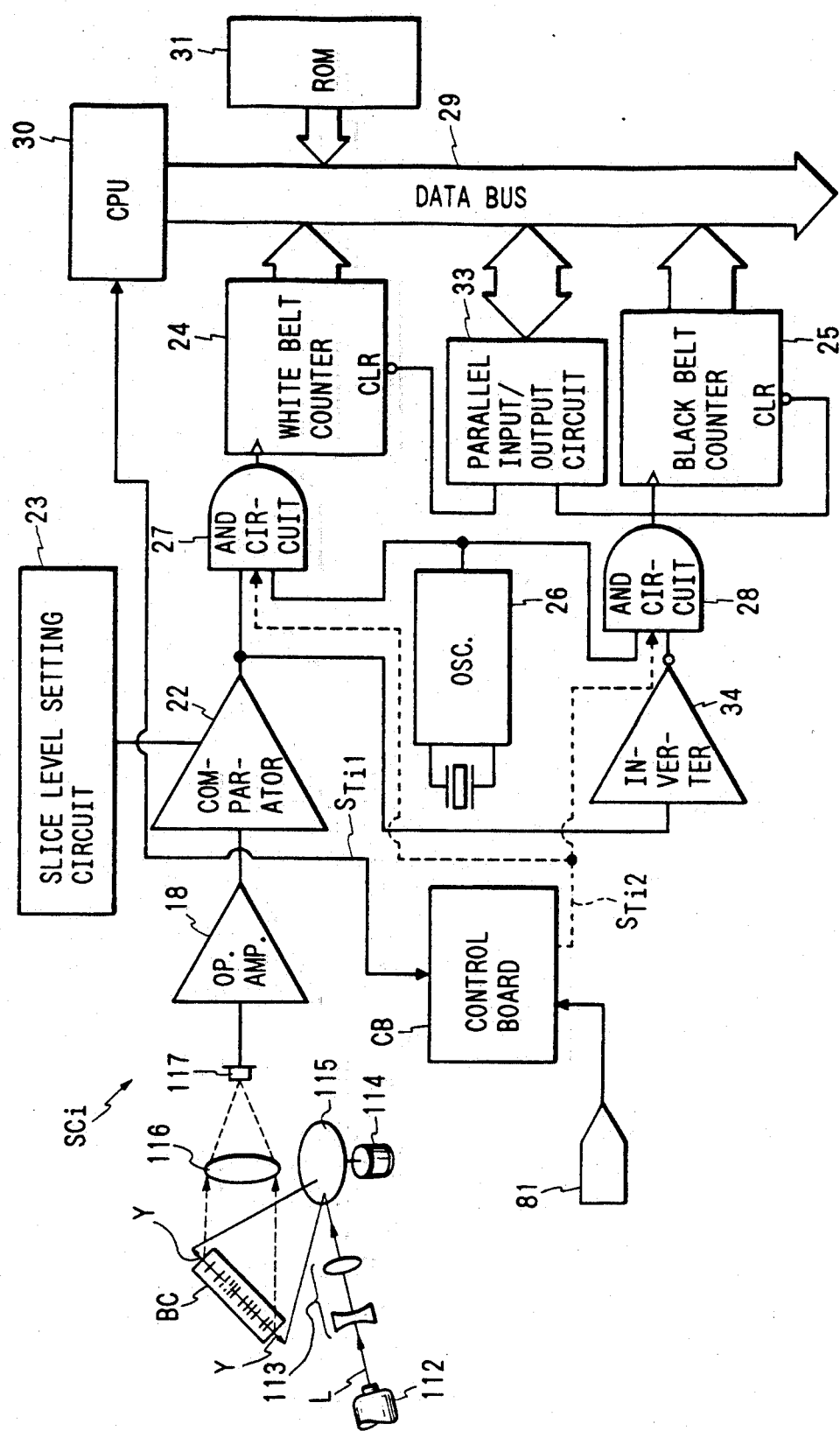
FIG. 20 is a block diagram showing the configuration of the scanner and the decoder in the third embodiment of this invention.

The configuration of the scanners and the decoders in those scanners is shown in FIG. 20.

Figure 11:
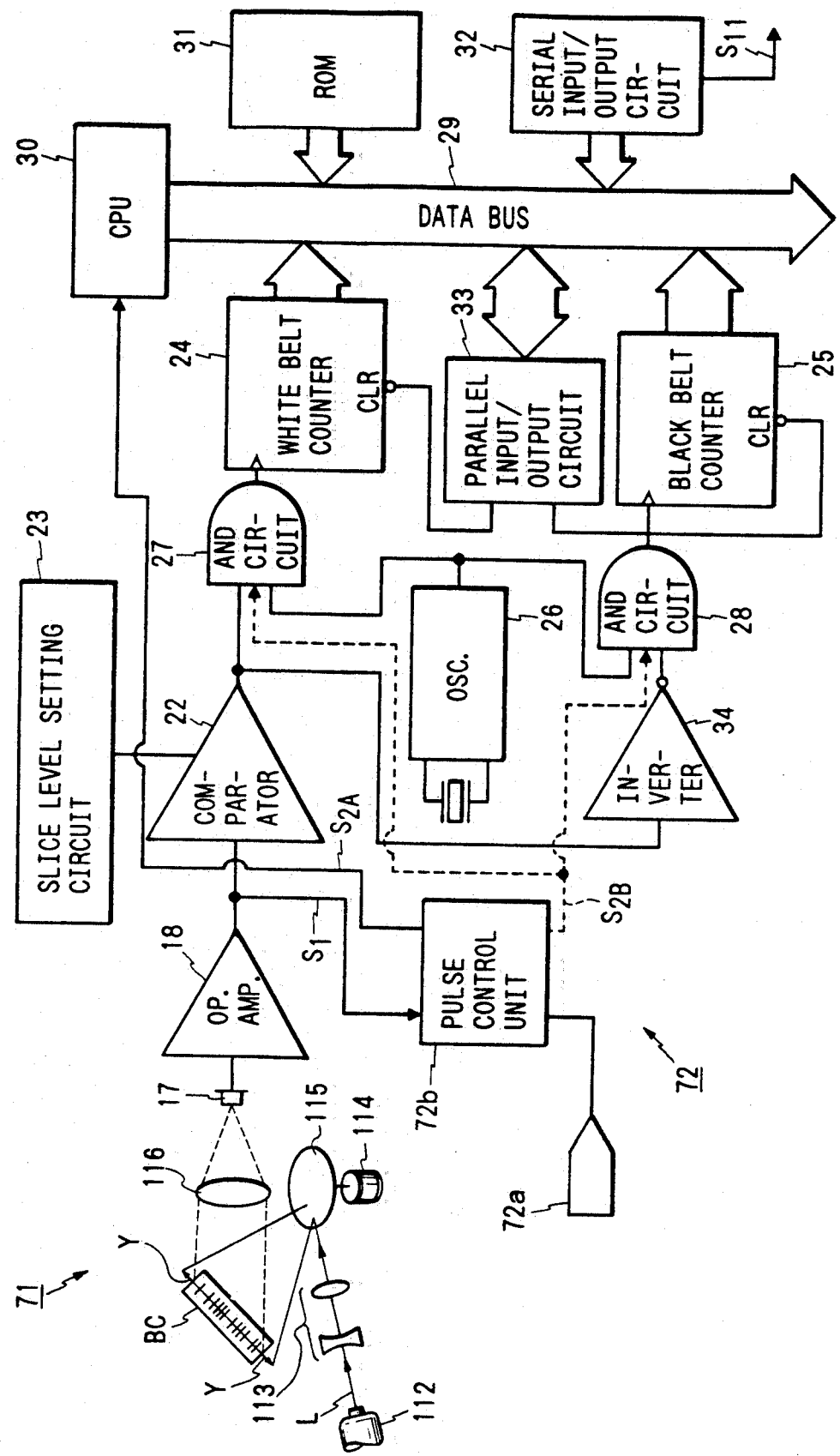
FIG. 11 is a block diagram showing the configuration of a print bar code reading unit in the second embodiment of this invention.

As shown in FIG. 20, a basic configuration of the scanners and the decoders in those scanners is the same as that of the second embodiment shown in FIG. 11. Further, the scanner $SC_i$ may be connected with the control board CB as shown in FIG. 20, in addition to an example of connection shown in FIG. 19.

The method of controlling the reading timing will now be described with reference to FIGS. 21(A) to 23.

Figure 21A:
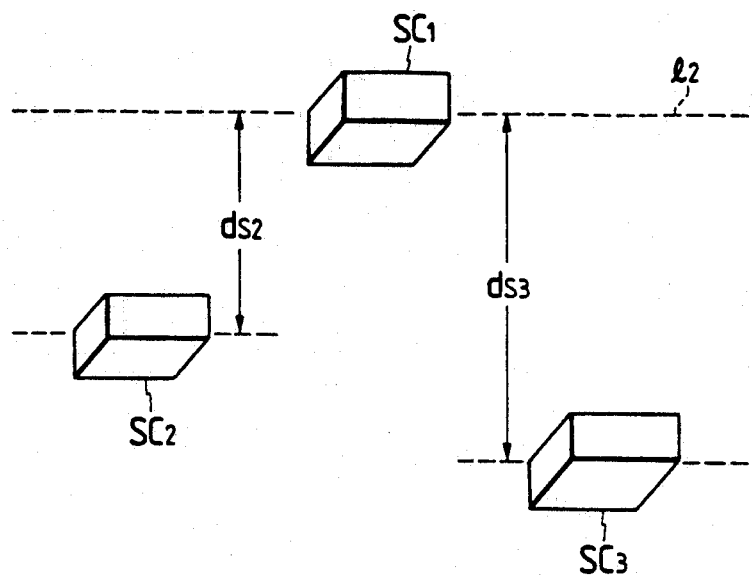
FIGS. 21(A), 21(B), 22(A), 22(B) and 23 are explanatory views showing a method of controlling the control board in FIG. 19, FIGS. 24(A) to 24(E) are a flowchart showing a control program of the control board in FIG. 19, FIGS. 25 and 26 are flowcharts showing the operating program of the reading board in FIG. 19, and FIGS. 27(A) and 27(B) are a flowchart showing the operating program of the host computer in FIG. 19.
Figure 21B:
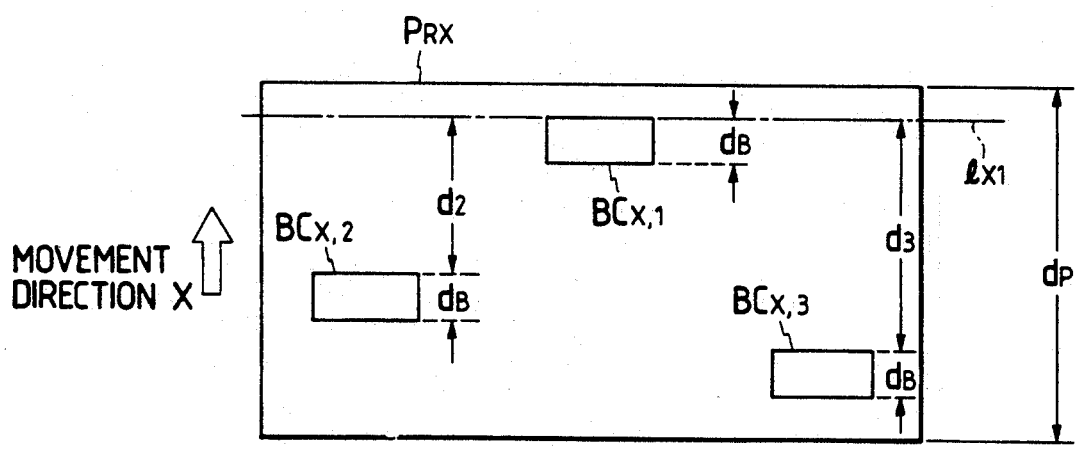

Layout of a document $P_{Rx}$ is shown in FIG. 21(B). Print bar codes $BC_{x, 1}$, $BC_{x, 2}$, and $BC_{x, 3}$ are attached to the document $P_{Rx}$. The document $P_{Rx}$ has a length of $d_p$ in the movement direction. This length $d_p$ also indicates an interval between, e.g., a print bar code $BC_{x, 1}$ and a print bar code $BC_{x+1, 1}$ on the next document $P_{R, x+1}$. The print bar code $BC_{x, 1}$ indicates an initial print bar code of the document $P_{Rx}$ with respect to the movement direction X. The print bar code $BC_{x, 1}$ is located at a position succeeding to the print bar code $BC_{x, 1}$ with respect to the movement direction. Further, the print bar code $BC_{x, 3}$ is located at a position succeeding to the print bar code $BC_{x, 2}$. Respective print bar codes $BC_{x, 1}$ to $BC_{x, 3}$ have a length of $d_B$ with respect to the movement direction X. When a line obtained by extending the forefront boundary line with respect to the movement direction of the initial print bar code $BC_{x, 1}$ is designated by $l_{x1}$, a distance from the line $l_{x1}$ up to the forefront boundary line of respective print bar codes is $d_1 (=0)$ for $BC_{x, 1}$, $d_2$ for $BC_{x, 2}$, and $d_3$ for $BC_{x, 3}$. Here, the print bar code $BC_{x, 1}$ is referred to as a reference bar code, and $l_{x1}$ is referred to as a first reference line. The layouts of respective print bar codes $BC_{x, 1}$ to $BC_{x, 3}$ are fixed with respect to all the documents. The first reference line $l_{x1}$ serves as a first reference position. The first reference lines, i.e., first reference positions are set with respect to respective documents. They move along with the body P.

On the other hand, scanners for reading print bar codes are arranged as shown in FIG. 21(A). Namely, scanners $SC_1$ to $SC_3$ are arranged immediately above the loci of respective print bar codes in order that they can scan the respective print bar codes. Here, a line $l_2$ obtained by extending a projector of the forefront boundary line of the scanner $SC_1$ corresponding to the reference bar code $BC_{x', 1}$ is referred to as a second reference line, and the scanner $SC_1$ is referred to as a reference scanner. A distance from the second reference line $l_2$ up to the projector of the forefront boundary lines of respective scanners is $d_{S1} (=0)$ for $SC_1$, $d_{S2}$ for $SC_2$, and $d_{S3}$ for $SC_3$. In this instance, the second reference line $l_2$ serves as a second reference position or a reference plane. While the positions of respective scanners may be arbitrarily set, they are fixed positions in space with respect to a document. Accordingly, the second reference line, i.e., the second reference position is the fixed position in space. In this case, the distances $d_{S1}$ to $d_{S3}$ are arbitrary. As long as they do not overlap with each other, the relationship expressed as $d_{S1}=d_{S2}=d_{S3}=0$ may hold, i.e., all scanners may be provided in parallel in alignment with each other.

A timing pulse is outputted from the rotary encoder 81 to the control board CB. The rotary encoder serves as an encoder to measure a rotational angular displacement. Such encoders to generate 100 to 50,000 timing pulses per each rotation. This number of pulses is called a resolution. In this embodiment, a rotary encoder having a resolution of 1000 pulses per each rotation is employed. When the rotational ratio between a press cylinder (not shown) in the printing machine M and the rotary encoder 81 is assumed to be A:B, $1000 \times B/A$ timing pulses are outputted every time the press cylinder makes one rotation. When the circumferential length of the press cylinder is assumed as $d_c$, the number of pulse counts $N_p$ corresponding to the document length $d_p$ is expressed below:

$$N_p = \frac{1000 \times B \times d_p}{A \times d_c}$$

In the case where one circumferential length of the press cylinder corresponds to m documents, i.e., the number of printing matter for the press cylinder is m, the number of pulse counts $N_p$ is expressed as follows:

$$N_p = \frac{1000 \times B \times d_B}{A \times d_c}$$

The numbers of counts $N_2$ and $N_3$ corresponding to the respective distances $d_2$ and $d_3$ are expressed as follows:

$$N_2 = \frac{1000 \times B \times d_2}{A \times d_c}$$

$$N_3 = \frac{1000 \times B \times d_3}{A \times d_c}$$

The numbers of counts such that the front end of the reference bar code $BC_{x,1}$ is set to 0 are referred to as the A-phase count. Since the numbers of counts of the A-phase correspond to positions on respective documents, it is possible to specify the positional relationships or the distances on respective documents. Further, a count (zero) generated every time the encoder makes one rotation is referred to as a Z-phase count.

Let consider the case where the first reference line $l_{x1}$ of the document $P_{Rx}$ moves to overlap with the second reference line $l_2$ serving as a reference line of each scanner. The number of counts at this moment is assumed as a reference scan count $N_{S1}$. By allowing the reference scanner $SC_1$ to scan for a time period corresponding to a count from the reference scan count $N_{S1}$ to the count $N_B$, it is possible to read the reference bar code $BC_{x,1}$. Now, when the reference scan count $N_{S1}$ is assumed to be equal to zero, the number of scan counts $N_{S2}$ which is the number of counts at which the print bar code $BC_{x,2}$ should be scanned is expressed as follows:

$$N_{S2} = r\left(N_p \times \frac{d_2}{d_p} + N_p - r\left(N_p \times \frac{d_{S2}}{d_p}\right)\right)$$

In the above equation, r(X) represents a remainder (integer value) in the case where x is divided by $N_p$. For example, in the case of $d_p=10$ cm, $d_2=4$ cm, $d_{S2}=8$ cm and $N_p=100$ counts, the latter part of the right side of the above-mentioned equation is expressed as follows:

$$r\left(100 \times \frac{8}{10}\right) = r(80) = (80)$$

Thus, the above-mentioned equation is rewritten as follows:

$$N_{S2} = r\left(100 \times \frac{4}{10} + 100 - 80\right) = r(60) = (60)$$

Accordingly, if the scanner $SC_2$ is scanned at a time after $N_{S2}=60$ counts from the reference scan count $N_{S1}$, it is possible to read the print bar code $BC_{x,2}$. Generally, a scan count $NS_i$ required for scanning the print bar code $BC_{x,i}$ having the position of the distance $d_i$ from the first reference line by a certain scanner $SC_i$ becomes equal to the number of counts expressed below when the reference scan count $N_{S1}$ is taken as a reference.

$$N_{Si} = r\left(N_p \times \frac{d_i}{d_p} + N_p - r\left(N_p \times \frac{d_{si}}{d_p}\right)\right)$$

The meaning of respective terms of the above-mentioned equation will now be described. $N_p \times d_i/d_p$ represents a distance $d_i$ from the first reference line $l_{x1}$ up to the print bar code $BC_{x,i}$. $N_p$ represents a fixed length (fixed period) $d_p$. $N_p \times d_{si}/d_p$ represents a distance from the reference plane $l_2$ up to the scanner $SC_i$. The meaning of the equation of the right side is as follows. If the scanner $SC_i$ is present on the first reference line, it is sufficient to conduct a scanning after the count value of $N_p \times d_i/d_p$ from the reference count. However, since the scanner $SC_i$ is spaced from the reference plane $l_2$ by $d_{si}$, it is required to make a substraction corresponding to $N_p \times d_{si}/d_p$. In this case, $r(N_p \times d_{si}/d_p)$ or $N_p \times d_{si}/d_p$ itself may be used. Further, the reason why $N_p$ is added is to allow x of r(x) to be positive value.

By controlling respective scanners in this way, it is possible to scan and read all bar codes of a document moving in an X-direction without break. In this case, the integer remainder value r(x) obtained by dividing x by $N_p$ has the following equation:

$$r(A) = r\{r(A)\}$$
$$r(A + B) = r\{r(A) + r(B)\}$$
$$= r\{r(A) + B\}$$
$$= r\{A + r(B)\}$$

Accordingly, $N_{Si}$ may be expressed as follows:

$$N_{Si} = r\left(N_p \times \frac{d_i}{d_p} + N_p - N_p \times \frac{d_{si}}{d_p}\right)$$
$$= r\left(r\left(N_p \times \frac{d_i}{d_p}\right) + N_p - N_p \times \frac{d_{si}}{d_p}\right)$$

-continued $$= r\left\{ r\left(N_p \times \frac{d_i}{d_p}\right) + N_p - r\left(N_p \times \frac{d_{si}}{d_p}\right) \right\}$$

Further, since division by $N_p$ is carried out in determining $N_{Si}$, it is possible to specify what number of documents a print bar code scanned belongs to by the value of quotient. Measured data is transmitted to the host computer 84 through the interface to specify which print bar code the measured data belongs to by document layout data and scanner position data determined in advance. Since a position difference of the specified data with respect to the reference bar code is made clear, an approach is employed to apply seeming addition or subtraction to the print bar code of a document including the reference bar code to make data uniform to thereby judge correspondence of data in the document including the reference bar code. The period for scanning the scanner (pulse number $N_B$) may be about 1.5 $N_B$ which is a value obtained by further adding a marginal value to the above-mentioned $N_B$.

Figure 22A:
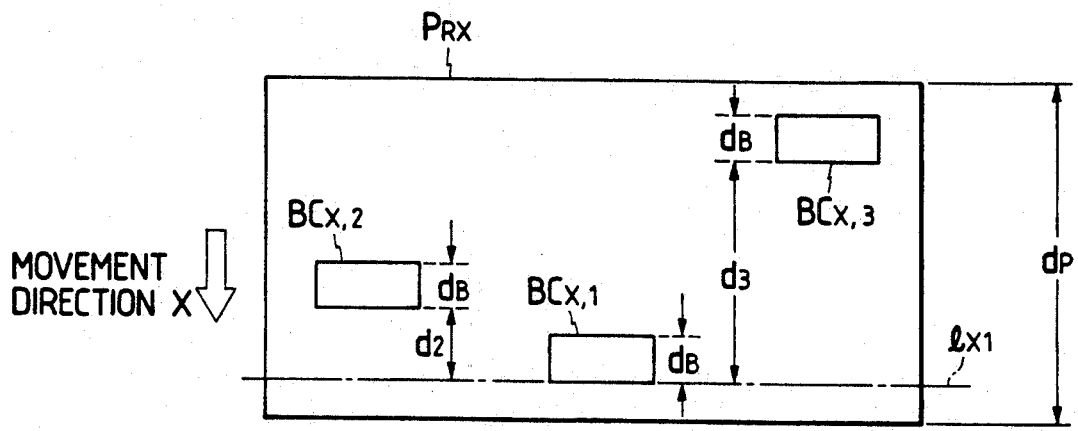

The above-mentioned reading timing control may be conducted by using another method shown in FIG. 22. Layout of a certain document $P_{RX}$ is shown in FIG. 22(A). Print bar codes $BC_{x, 1}$, $BC_{x, 2}$ and $BC_{x, 3}$ are attached to the document $P_{RX}$. The document $P_{RX}$ has a length of $d_p$ in the movement direction. The length $d_p$ also represents an interval between, e.g., a print bar code $BC_{x, 1}$ and a print bar code $BC_{x+1, 1}$ on the next document $P_{R, x+1}$. The print bar code $BC_{x, 1}$ is an initial print bar code of the document $P_{RX}$ with respect to the movement direction. The print bar code $BC_{x, 2}$ is located at a position succeeding to the print bar code $BC_{x, 1}$ with respect to the movement direction. Further, the print bar code $BC_{x, 3}$ is located at a position succeeding to the print bar code $BC_{x, 2}$ with respect to the movement direction.

Respective print bar codes $BC_{x, 1}$ to $BC_{x, 3}$ have a length of $d_B$ with respect to the movement direction. When a line obtained by extending the forefront boundary line with respect to the movement direction of the initial print bar code $BC_{x, 1}$ is designated by $l_{x1}$, a distance from the line $l_{x1}$ up to the forefront boundary line of respective print bar codes is $d_1$ ($=0$) for $BC_{x, 1}$, $d_2$ for $BC_{x, 2}$, and $d_3$ for $BC_{x, 3}$. Here, the print bar code $BC_{x, 1}$ is referred to as a reference bar code, and $l_{x1}$ is referred to as a first reference line. The layouts of respective print bar codes $BC_{x, 1}$ to $BC_{x, 3}$ are fixed with respect to all the documents. The first reference line $l_{x1}$ serves as a first reference position. The first reference lines, i.e., first reference positions are set with respect to respective documents. They move along with the body P.

Figure 22B:
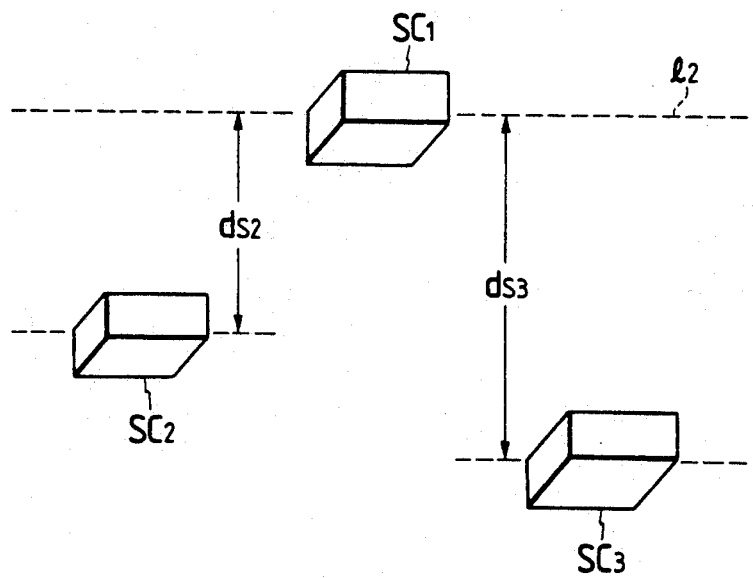

On the other hand, scanners for reading print bar codes are arranged as shown in FIG. 22(B). Namely, scanners $SC_1$ to $SC_3$ are arranged immediately above the loci of respective print bar codes in order that the scanners scan the respective print bar codes. Here, a line $l_2$ obtained by extending a projector of the forefront boundary line of the scanner SC corresponding to the reference bar code $BC_{x, 1}$ is referred to as a second reference line, and the scanner $SC_1$ is referred to as a reference scanner. A distance from the second reference line $l_2$ up to the projector of the fore front boundary lines of respective scanners is $d_{s1}$ ($=0$) for $SC_1$, $d_{s2}$ for $SC_2$, and $d_{s3}$ for $SC_3$. In this instance, the second reference line $l_2$ serves as a second reference position or a reference plane. While the positions of respective scanners may be arbitrarily set, they are fixed positions in space with respect to a document. Accordingly, the second reference line, i.e., the second reference position is the fixed position. In this case, the distances $d_{s1}$ to $d_{s3}$ are arbitrary. As long as they do not overlap with each other, the relationship expressed as $d_{s1}=d_{s2}=d_{s3}=0$ may hold, i.e., all scanners may be provided in parallel in alignment with each other. In this case, the numbers of counts corresponding to respective distances $d_2$ and $d_3$ are expressed as follows:

$$N_2 = \frac{1000 \times B \times d_2}{A \times d_c}$$

$$N_3 = \frac{1000 \times B \times d_3}{A \times d_c}$$

Let consider the case where the first reference line $l_{x1}$ of the document $P_{RX}$ moves to overlap with the second reference line $l_2$ serving as a reference line of each scanner. The number of counts at this moment is assumed as a reference scanner count $N_{S1}$. By allowing the reference scanner $SC_1$ to scan for a time period corresponding to a count from the reference scan count $N_{S1}$ to the count $N_B$, it is possible to read the reference bar code $BC_{x, 1}$. Now, when the reference scan count $N_{S1}$ is assumed to be equal to zero, the number of scan counts $N_{S2}$ which is the number of counts at which the print bar code $BC_{x, 2}$ should be scanned is expressed as follows:

$$N_{S2} = r\left( N_p \times \frac{d_2}{d_p} + N_p \times \frac{d_{s2}}{d_p} \right)$$

In the above equation, r(x) represents a remainder (integer value) in the case where x is divided by $N_p$. For example, in the case of $d_p=10$ cm, $d_2=2$ cm, $d_{s2}=15$ cm and $N_p=100$ counts, the letter part of the right side of the above-mentioned equation is expressed as follows:

$$r\left( 100 \times \frac{15}{10} \right) = r(150) = 50$$

Thus, the above-mentioned equation is rewritten as follows:

$$r\left( 100 \times \frac{2}{10} + 50 \right) = r(70) = 70$$

Accordingly, if the scanner $SC_2$ is scanned at a time after $N_{S2}=70$ counts from the reference scan count $N_{S1}$, it is possible to read the print bar code $BC_{x, 2}$. Generally, a scan count $N_{Si}$ required for scanning the print bar code $BC_{x, i}$ having the position of the distance $d_i$ from the first reference line by a certain scanner $SC_i$ becomes equal to the number of counts expressed below when the reference scan count $N_{S1}$ is taken as a reference.

$$N_{Si} = r\left( N_p \times \frac{d_i}{d_p} + N_p \times \frac{d_{si}}{d_p} \right)$$

The meaning of respective terms of the above-mentioned equation will now be described. $N_p \times d_i/d_p$ represents a distance $d_i$ from the first reference line $l_{x1}$ up to the print bar code $BC_x$, $i$. $N_p \times d_{si}/d_p$ represents a distance from the reference plane $l_2$ up to the scanner $SC_i$. The meaning of the equation of the right side of $N_{Si}$ represents a count corresponding to a distance from the print bar code $BC_{x, 1}$ up to the scanner $SC_i$.

By controlling respective scanners in this way, it is possible to scan and read all bar codes of a document moving in an X-direction without break. In this case, $N_{Si}$ is expressed as follows:

$$N_{Si} = r\left(N_p \times \frac{d_i}{d_p} + r\left(N_p \times \frac{d_{si}}{d_p}\right)\right)$$

$$= r\left(r\left(N_p \times \frac{d_i}{d_p}\right) + N_p \times \frac{d_{si}}{d_p}\right)$$

$$= r\left(r\left(N_p \times \frac{d_i}{d_p}\right) + r\left(N_p \times \frac{d_{si}}{d_p}\right)\right)$$

Figure 23:
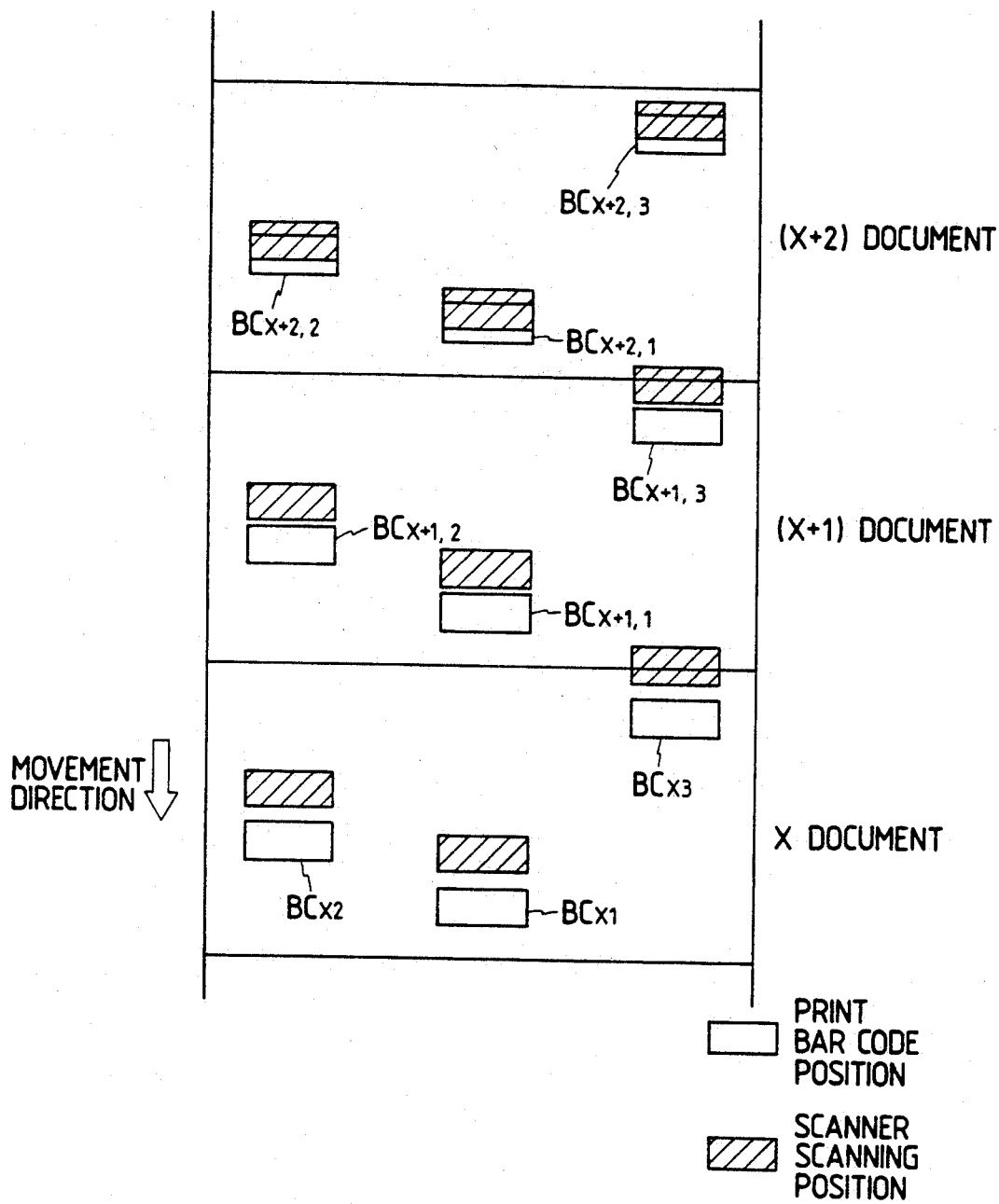
Figure 24B:
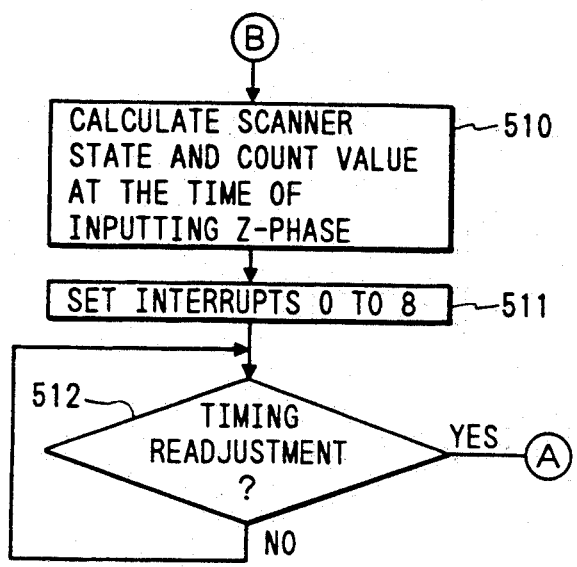
Figure 24C:
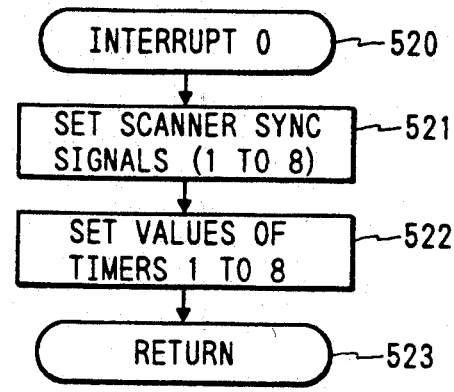
Figure 24D:
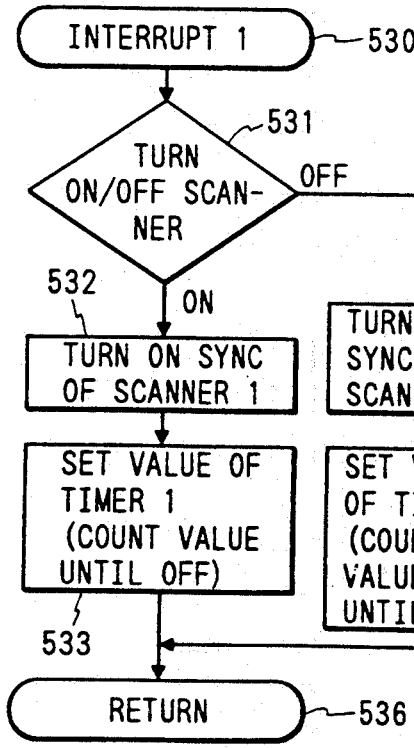
Figure 24E:
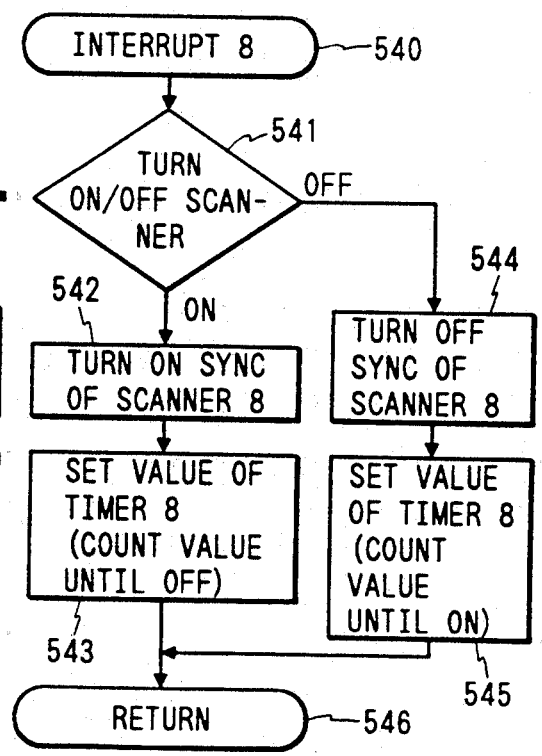

If the reference scanner can scan the reference bar code at all times in a manner stated above, synchronization of scanning of other print bar codes can be provided. A method of providing a scanning timing of the reference scanner is shown in FIG. 23. In FIG. 23, the hatching portions represent positions scanned by the scanner. In the X document which is the X.th document, the scanning position by the scanner is backward with respect to an actual print bar code position, and it is indicated that synchronization is delayed. In the (X+1) document, synchronization is shifted to a leading position of a very small quantity, but bar code has not been yet read. In the (X+2) document, it is indicated that all bar codes can be read by further shifting the synchronous position to a leading position. After all the bar codes have read, an approach is employed to shift the synchronous position until asynchronization is provided thereafter to set SYNC start and end positions on the negative and positive sides using the asynchronous point as a reference. This is because if the start and end positions of SYNC are determined at the synchronous time point, the position which can be securely read cannot be determined. After synchronization is provided in this way, respective scanners are subjected ON/OFF control using the count $N_p$ corresponding to the document length $d_p$ as a period.

The above-mentioned modification of synchronization is carried out by the control board CB in accordance with the flowchart shown in FIGS. 24(A) to 24(E). Namely, at step 504 in the case where all the scanners cannot be read, rough adjustment is carried out until they can be read (step 505). Further, fine adjustment after synchronization is once provided is carried out at steps 506 to 512 (steps 520 to 523, 530 to 536, 540 to 546).

The control board comprises a 15 bit additive counter (not shown) in order to count A-phase. At steps 503 and 508, this 15 bit additive counter is used to take a measure such that an absolute position in synchronization is not shifted by delays in processing. When Z-phase is inputted, this counter is cleared. In this case, in the case where the rotation number ratio between the press cylinder and the encoder is 1:1, there is no problem. However, if otherwise, there are instances where there may any shift between the first reference line on the document and the Z-phase position. In the case of, e.g., A:B=6:4, this relationship is rewritten as follows: A:B=6:4=3:2.

Accordingly, the Z-phase count becomes in correspondence with the first reference line on the document for a second time. Thus, how many number of times K makes return the Z-phase to the original position is determined to carry out count clear only once every number of times K. Namely, in the case of K=2, count clear is carried out every two times of the Z-phase, and the count itself of the A-phase is carried out up to 2000 counts. K is a value of B obtained by reducing the ratio of A:B. In FIGS. 24(A) to 24(E), as the interrupt processing "interrupt 1" to "interrupt 8", 8 bit subtractive counters (not shown) are used. The reason why these counters is that the polling processing becomes complicated in the case of the pentadecimal counter, resulting in the possibility that the total number test may not be conducted. In this case, since any errors may be accumulated in the case of the interrupt processing by the subtractive counter, correction by the Z-phase clear is carried out.

Figure 25:
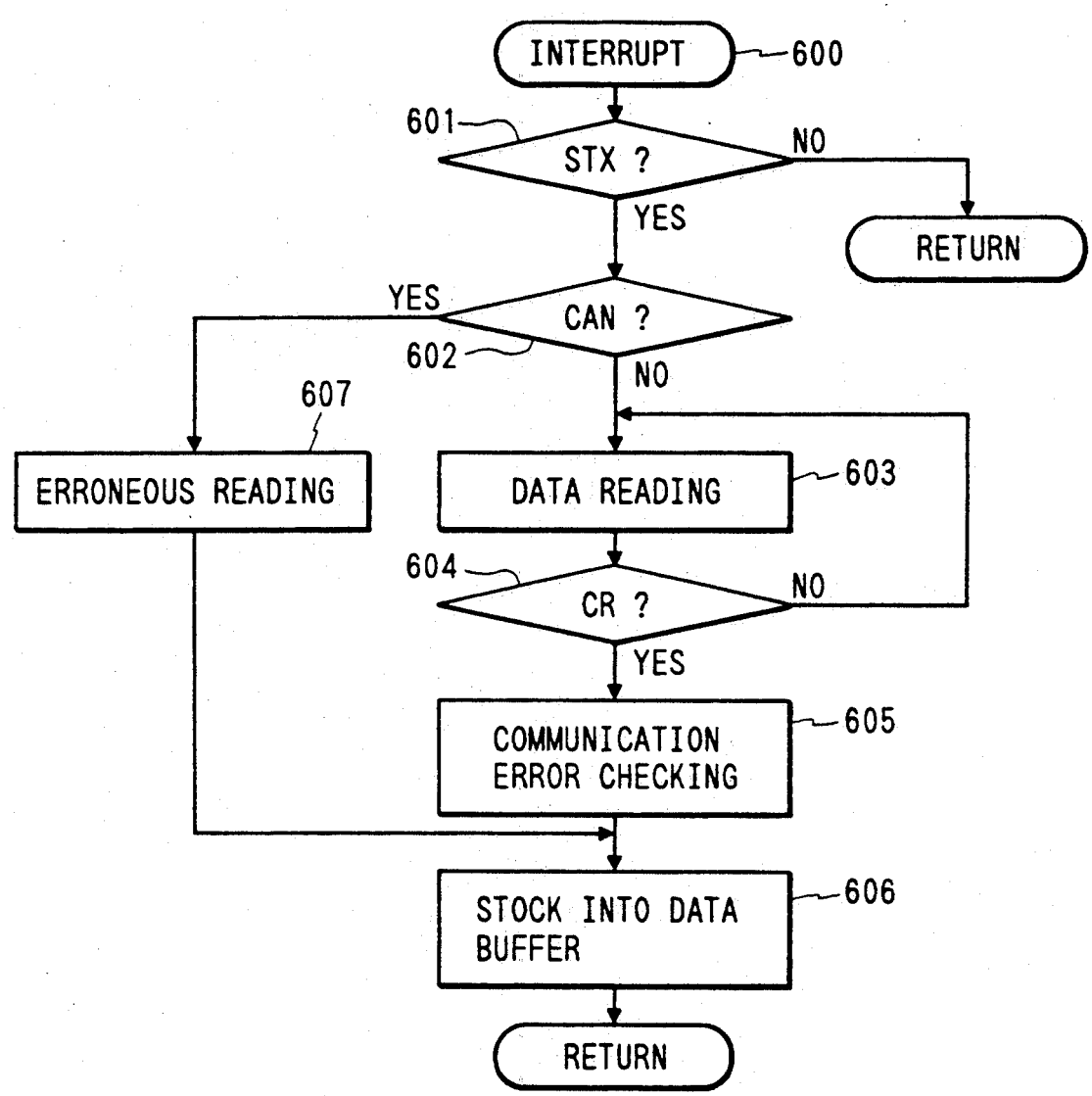
Figure 27A:
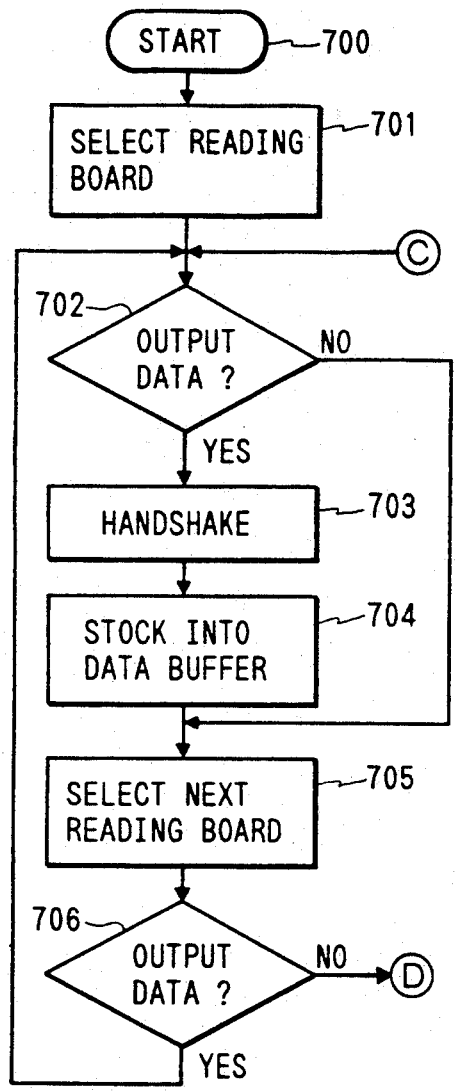
Figure 27B:
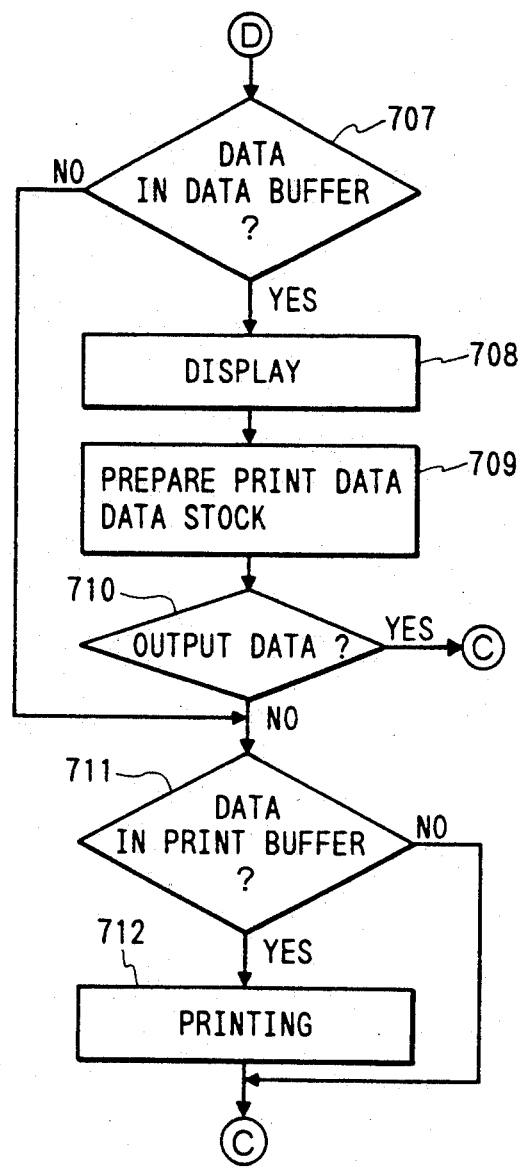

FIGS. 25 and 26 show a flowchart (steps 600 to 619) of the outline of the reading board. FIG. 25 is a flowchart for reading operation (communication) from respective scanners, and FIG. 26 is a flowchart for checking read data. FIGS. 27(A) and (B) is a flowchart (steps 700 to 712) of the outline of the host computer. In this flowchart, step 601 indicates "start of text ?", step 602 indicates "cancel ?", and step 604 indicates "carriage return ?".

In this way, the control board CB controls the read timing. In addition, as shown in FIG. 3, an approach may be employed to receive an initial reading signal from the CPU 30 thereafter to output a signal $S_{Ti1}$ to the CPU 30 to inhibit/restart data processing subsequent thereto, or an approach may be employed to output a signal $S_{Ti2}$ to AND circuits 27 and 28 to inhibit/restart the white and black belt counters 24 and 25 and components succeeding thereto. Further, an approach may be employed to interrupt/open the optical path of a laser beam L scanning the print bar code BC to inhibit/restart the optical reading operation.

Since the timings at which a plurality of print bar codes BC should be read are determined in a manner stated above, even if the interval in which print bar codes are printed is varied in dependency upon the item of printing articles, they can be securely read. In the event that the scanners fail to read print bar codes BC, a reading disable signal is outputted from the control board CB after the above-mentioned inhibit time is completed.

As stated above, in accordance with the print bar code reading apparatus 83 of this embodiment, it is sufficient for an operator to only input a layout value of bar codes, thus making it possible to lessen the operator's labor.

The configuration in the third embodiment is only an example, and therefore does not limit the print bar code reading apparatus of this invention. For example, identification marks to be detected are not limited bar codes, but may be codes/marks of other kinds, etc. It is not necessarily required that bar codes within one document are all the same. If such bar codes are all different from each other, they can be read.

Further, in the case of conducting a reading operation by using a laser beam in the scanner, a laser system except for the semiconductor laser, e.g., a He-Ne gas laser, etc. may be used as the laser output unit. In addition, in the case of conducting a reading operation without using a laser beam, there may be employed a reading system by a camera, a line sensor system, or a system using infrared ray or magnetism, etc.

Further, the position detection unit may be not only a rotary encoder but also an ordinary clock generation circuit, and may include various speed sensors as the speed detection unit to adjust the number of pulses in dependency upon a body movement speed.

In addition, the first reference line serving as the first reference position and the second reference line serving as the second reference position may be selected at other positions. For example, an approach may be employed to select the first reference line at a position spaced by $\frac{1}{2} d_B$ from the forefront end of the reference bar code, i.e., at the central portion of the reference bar code with respect to the movement direction, and to select the second reference line at the central portion of the reference scanner $SC_1$. In this case, $N_B$ may take other values.

As described above, in accordance with the third embodiment, since it is possible to scan the total number of a plurality of identification marks such as print bar codes arranged at a fixed layout, etc. to securely read them one by one, this apparatus is suitable as the detection unit of an apparatus for checking whether or not the total number of identification marks printed on a print roll sheet is good. In addition, as other applications, there is conceivable an apparatus for checking development state of all the processes of flow production such as automation, or the like. In short, this apparatus can be also applied to all systems utilizing a mechanism capable of securely checking identification marks on a moving body.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An identification mark reading apparatus adapted to test whether or not identification marks successively printed on a body or an object in the form of sheet by a printing machine are correctly printed while said body or object is moving in a predetermined moving direction, said apparatus comprising:

reading means for sequentially reading said identification marks at a reading position to output binarized identification mark data, means for displaying said identification mark data, judgement means for comparing said identification mark data with identification mark data of identification marks to be primarily printed to judge whether or not said identification marks are correctly printed, means for producing a notifying signal when said judgement means judges that said identification marks are not correctly printed, and reading timing control means for effecting a control to receive an initial identification mark data of a preceding identification mark in the moving direction, thereafter to inhibit a reading operation of said reading means by a time corresponding to an inhibit distance shorter than a distance required until at least a succeeding identification mark succeeding to said preceding identification mark reaches said reading position and to restart said inhibited reading operation after movement of said inhibit distance.

2. An identification mark reading apparatus as set forth in claim 1, wherein said identification marks are print bar codes.

3. An identification mark reading apparatus as set forth in claim 1, wherein said body or object in the form of sheet is a roll sheet paper.

4. An identification mark reading apparatus as set forth in claim 2, wherein said reading means comprises a laser beam output unit for outputting a laser beam, a laser beam scanning unit for allowing said laser beam to scan said print bar codes by rotating a rotary polygon mirror, and a laser beam condenser unit for condensing said laser beam scanning said print bar codes and reflected therefrom.

5. An identification mark reading an apparatus adapted to individually read identification marks attached on a moving body or an object at suitable intervals in a movement direction of said moving body or object, each comprises a plurality of identifiers having predetermined widths in the movement direction and arranged in a direction perpendicular to said movement direction, the apparatus comprising:

reading means for scanning said identification mark in an arrangement direction of the identifiers at a predetermined reading position to output a reading signal, and reading timing control means for effecting a control to receive an initial reading signal of a preceding identification mark in said moving direction thereafter to inhibit said reading operation of said reading means, or to inhibit the processing of a reading signal by a time corresponding to a distance shorter than a distance required until at least a succeeding identification mark succeeding to said preceding identification mark reaches said reading position to restart said reading operation or processing after movement of said inhibit distance.

6. An identification mark reading apparatus as set forth in claim 5, wherein said inhibit distance is detected by counting, in dependency upon a movement speed of said body at that time point, the number of clock pulses corresponding thereto.

7. An identification mark reading apparatus as set forth in claim 5 or 6, wherein said identification marks are printed bar codes, said reading timing control means comprising a pulse count unit operative to carry out count clear in response to an initial reading signal from said reading means to output said read stop signal and at the same time start counting of the number of timing pulses from that time point, thus to output a read restart signal when the number of timing pulses reaches a set pulse number set in advance; a pulse number conversion unit for converting read stop section length data set in advance to corresponding number of timing pulses to set it as said set pulse number at said pulse count unit; a pulse generation unit for outputting a timing pulse corresponding to a movement distance of said moving body to said pulse count unit and said pulse number conversion unit; and a speed detection unit for detecting a movement speed of said moving body.

8. An identification mark reading apparatus for individually reading a plurality of identification marks arranged at mark positions having a fixed interval in a movement direction of a moving body or object, each identification mark being comprised of a plurality of identifiers arranged in a direction perpendicular to said movement direction, said apparatus comprising:
a plurality of reading means for respectively scanning said plurality of identification marks in the arrangement direction of said identifiers at predetermined reading positions to output reading signals, and
reading timing control means for controlling to cause reading means of said plurality of reading means corresponding to an arbitrary mark position to scan, after said object moves a distance, from the time point when any one of a plurality of first reference positions set at a fixed interval in said movement direction of said moving object passes through a reference plane including a second reference position set at a fixed point outside said moving body and being perpendicular to said movement direction, said distance corresponds to a value expressed by the following equation:

$$r\{D_{xi}+D_p-r(D_{Ri})\}$$

where the fixed interval is designated by $D_p$, a distance from any one of first reference positions up to said arbitrary mark position is designated by $D_{xi}$, a distance from a reading position of said reading means scanning said arbitrary mark up to said reference plane is designated by $D_{Ri}$, and a remainder of division for dividing an arbitrary value A by said fixed interval $D_p$ is designated by r(A).

9. An identification mark reading apparatus for individually reading a plurality of identification marks arranged at mark positions having a fixed interval in a movement direction of a moving body or object, each identification mark being comprised of a plurality of identifiers arranged in a direction perpendicular to said movement direction, said apparatus comprising:
a plurality of reading means for respectively scanning said plurality of identification marks in the arrangement direction of said identifiers at predetermined reading positions to output reading signals, and
reading timing control means for controlling to cause reading means of said plurality of reading means corresponding to an arbitrary mark position to scan, after said object moves a distance corresponding to a remainder value of division obtained by dividing, by said fixed interval, a distance between said mark position and said predetermined reading position corresponding thereto at the time point when any one of a plurality of first reference positions set at a fixed interval in said movement direction of said moving object passes through a reference plane including a second reference position set at a fixed point outside said moving body and being perpendicular to said movement direction.

10. An identification mark reading apparatus as set forth in claim 8 or 9, wherein said individual identification marks are individually printed print bar codes, said reading timing control means including a position detection unit for detecting the position of said moving body, and a reading timing control unit for computing reading timings of said individual print bar codes to output then to said plurality of reading means.

11. An identification mark reading apparatus as set forth in claim 10, wherein said position detection unit detects the position of said moving body to convert a distance from any one of said plurality of first reference positions to the number of pulses to output it.

12. An identification mark reading apparatus as set forth in claim 11, wherein said reading timing control unit controls to cause reading means of said plurality of reading means corresponding to an arbitrary mark position to scan, after said object moves a distance, from the time point when any one of a plurality of first reference positions set at a fixed interval in said movement direction of said moving object passes through a reference plane including a second reference position set at a fixed point outside said moving body and being perpendicular to said movement direction, said distance corresponds to a value expressed by the following equation:

$$r\left(N_p \times \frac{D_{xi}}{D_p} + N_p - r\left(N_p \times \frac{D_{Ri}}{D_p}\right)\right)$$

where the fixed interval is designated by $D_p$, a distance from any one of first reference positions up to said arbitrary mark position is designated by $D_{xi}$, a distance from a reading position of said reading means scanning said arbitrary mark up to said reference plane is designated by $D_{Ri}$, the number of interval pulses corresponding to said fixed interval $D_p$ outputted from said position detection unit is designated by $N_p$, and a remainder of division for dividing an arbitrary value A by the number of interval pulses $N_p$ is designated by r(A).

13. An identification mark reading apparatus as set forth in claim 11, wherein said reading timing control unit controls to cause reading means of said plurality of reading means corresponding to an arbitrary mark position to scan, after said object moves a distance from the time point when any one of a plurality of first reference positions set at a fixed interval in said movement direction of said moving object passes through a reference place including a second reference position set at a fixed point outside said moving body and being perpendicular to said movement direction, said distance corresponds to a value expressed by the following equation:

$$r\left(N_p \times \frac{D_{xi}}{D_p} + N_p \times \frac{D_{Ri}}{D_p}\right)$$

where the fixed interval is designated by $D_p$, a distance from any one of first reference positions up to said arbitrary mark position is designated by $D_{xi}$, a distance from a reading position of said reading means scanning said arbitrary mark up to said reference plane is designated by $D_{Ri}$, the number of interval pulses corresponding to said fixed interval $D_p$ outputted from said position detection unit is designated by $N_p$, and a remainder of division for dividing an arbitrary value A by the number of interval pulses $N_p$ is designated by r(A).

14. An identification mark reading apparatus as set forth in claim 12, wherein said identification marks are printed bar codes.

15. An identification mark reading apparatus as set forth in claim 13, wherein said identification marks are printed bar codes.

16. An apparatus according to claim 4, wherein said reading timing control means is adapted to inhibit said laser beam output unit from outputting the laser beam.

* * * * *